United States Patent
Su et al.

(10) Patent No.: US 10,538,057 B2
(45) Date of Patent: Jan. 21, 2020

(54) HIGH PERFORMANCE SEALABLE CO-EXTRUDED ORIENTED FILM, METHODS OF MANUFACTURE THEREOF AND ARTICLES COMPRISING THE SAME

(71) Applicants: Dow Global Technologies LLC, Midland, MI (US); Rohm and Haas Company, Philadelphia, PA (US)

(72) Inventors: Fengyi Su, Shanghai (CN); Jianping Pan, Shanghai (CN); Xiaobing Yun, Beijing (CN); Rajen M. Patel, Lake Jackson, TX (US); Yushan Hu, Pearland, TX (US); Yong Chen, Shanghai (CN)

(73) Assignees: DOW GLOBAL TECHNOLOGIES LLC, Midland, MI (US); ROHM AND HAAS COMPANY, Philadelphia, PA (US)

( * ) Notice: Subject to any disclaimer, the term of this patent is extended or adjusted under 35 U.S.C. 154(b) by 0 days.

(21) Appl. No.: 15/119,141

(22) PCT Filed: Feb. 19, 2015

(86) PCT No.: PCT/US2015/016610
§ 371 (c)(1),
(2) Date: Aug. 16, 2016

(87) PCT Pub. No.: WO2015/127073
PCT Pub. Date: Aug. 27, 2015

(65) Prior Publication Data
US 2017/0008253 A1    Jan. 12, 2017

(30) Foreign Application Priority Data
Feb. 19, 2014 (WO) ................ PCT/CN2014/072260

(51) Int. Cl.
  *B32B 7/12*       (2006.01)
  *B29C 48/00*    (2019.01)
  (Continued)

(52) U.S. Cl.
  CPC ............ *B32B 7/12* (2013.01); *B29C 48/0018* (2019.02); *B29C 48/22* (2019.02); *B29C 55/16* (2013.01);
  (Continued)

(58) Field of Classification Search
  CPC ... B29C 47/0057; B29C 47/067; B29C 55/16; B32B 27/08; B32B 27/32; B32B 37/10;
  (Continued)

(56) References Cited

U.S. PATENT DOCUMENTS 3,645,992 A    2/1972  Elston
3,914,342 A   10/1975  Mitchell
(Continued)

FOREIGN PATENT DOCUMENTS

EP    1318173 A1    6/2003
JP   H05281665 A   10/1993
(Continued)

OTHER PUBLICATIONS

US 5,693,387 A, 12/1997, Rosenbaum (withdrawn)
(Continued)

*Primary Examiner* — Travis M Figg
(74) *Attorney, Agent, or Firm* — Cantor Colburn LLP (57) ABSTRACT

Disclosed herein is a multilayered film comprising a first layer and a second layer; and a tie layer; where the tie layer comprises a crystalline block composite and where the tie layer is disposed between the first layer and the second layer; the first layer being disposed on a first surface of the tie layer; the second layer being disposed on a second surface of the tie layer; where the second surface is oppositely (Continued)

disposed to the first surface; where the multilayered film is biaxially oriented. Disclosed herein too is a method of manufacturing the aforementioned multilayer film.

19 Claims, 1 Drawing Sheet (51) Int. Cl.
| | |
|---|---|
| B29C 48/22 | (2019.01) |
| B32B 27/08 | (2006.01) |
| B32B 27/32 | (2006.01) |
| B29C 55/16 | (2006.01) |
| B32B 37/10 | (2006.01) |
| B65D 65/38 | (2006.01) |
| B29K 23/00 | (2006.01) |
| B29L 31/00 | (2006.01) |

(52) U.S. Cl.
CPC .............. *B32B 27/08* (2013.01); *B32B 27/32* (2013.01); *B32B 37/10* (2013.01); *B65D 65/38* (2013.01); *B29K 2023/06* (2013.01); *B29K 2023/12* (2013.01); *B29K 2995/0041* (2013.01); *B29L 2031/712* (2013.01); *B32B 2250/03* (2013.01); *B32B 2250/242* (2013.01); *B32B 2270/00* (2013.01); *B32B 2307/31* (2013.01); *B32B 2307/518* (2013.01); *B32B 2307/704* (2013.01); *B32B 2323/04* (2013.01); *B32B 2323/10* (2013.01); *B32B 2439/70* (2013.01); *B32B 2553/00* (2013.01)

(58) Field of Classification Search
CPC . B32B 7/12; B32B 2250/03; B32B 2250/242; B32B 2270/00; B32B 2307/31; B32B 2307/518; B32B 2307/704; B32B 2323/04; B32B 2323/10; B32B 2439/70; B32B 2553/00; B65D 65/38; B29K 2023/06; B29K 2023/12; B29K 2995/0041; B29L 2031/712
See application file for complete search history.

(56) References Cited

U.S. PATENT DOCUMENTS

| | | | |
|---|---|---|---|
| 4,076,698 | A | 2/1978 | Anderson et al. |
| 4,144,113 | A | 3/1979 | Mori et al. |
| 4,429,079 | A | 1/1984 | Shibata et al. |
| 4,599,392 | A | 7/1986 | McKinney et al. |
| 5,272,236 | A | 12/1993 | Lai et al. |
| 5,278,272 | A | 1/1994 | Lai et al. |
| 5,324,800 | A | 6/1994 | Welborn, Jr. et al. |
| 5,328,760 | A | 7/1994 | Gillberg-LaForce |
| 5,504,172 | A | 4/1996 | Imuta et al. |
| 5,582,923 | A | 12/1996 | Kale et al. |
| 5,733,155 | A | 3/1998 | Sagawa |
| 5,783,638 | A | 7/1998 | Lai et al. |
| 5,854,045 | A | 12/1998 | Fang et al. |
| 5,972,443 | A | 10/1999 | Breck et al. |
| 5,993,949 | A | 11/1999 | Rosenbaum |
| 6,254,944 | B1 | 7/2001 | Robert et al. |
| 6,525,157 | B2 | 2/2003 | Cozewith et al. |
| 6,727,000 | B2 | 4/2004 | Joly |
| 6,946,203 | B1 | 9/2005 | Lockhart |
| 6,960,635 | B2 | 11/2005 | Stevens et al. |
| 7,199,203 | B2 | 4/2007 | Stevens et al. |
| 7,335,424 | B2 | 2/2008 | Domine et al. |
| 7,405,008 | B2 | 7/2008 | Domine et al. |
| 8,106,139 | B2 | 1/2012 | Marchand et al. |
| 8,119,235 | B1 | 2/2012 | Vogel et al. |
| 8,802,774 | B2 | 8/2014 | Carnahan |
| 8,916,249 | B2 | 12/2014 | Liang |
| 2002/0182391 | A1 | 12/2002 | Migliorini et al. |
| 2004/0009360 | A1* | 1/2004 | Longo .................. B29C 55/023 428/476.3 |
| 2004/0013890 | A1 | 1/2004 | Kovalchuk et al. |
| 2004/0121172 | A1 | 6/2004 | Hofmann |
| 2006/0057410 | A1 | 3/2006 | Saavedra |
| 2007/0004860 | A1 | 1/2007 | Leboeuf |
| 2007/0275219 | A1 | 11/2007 | Patel et al. |
| 2011/0082249 | A1 | 4/2011 | Shan et al. |
| 2011/0082257 | A1 | 4/2011 | Carnahan et al. |
| 2011/0082258 | A1 | 4/2011 | Walton et al. |
| 2011/0313106 | A1 | 12/2011 | Shan et al. |
| 2011/0313107 | A1 | 12/2011 | Shan et al. |
| 2011/0313108 | A1 | 12/2011 | Shan et al. |
| 2012/0034444 | A1* | 2/2012 | Chen ...................... B32B 27/32 428/220 |
| 2012/0060997 | A1 | 3/2012 | Mitchell et al. |
| 2012/0111407 | A1 | 5/2012 | Rummens |
| 2013/0011669 | A1 | 1/2013 | Lu et al. |
| 2013/0095335 | A1 | 4/2013 | Hermel-Davidock |
| 2013/0177720 | A1 | 7/2013 | Liang |
| 2013/0303680 | A1 | 11/2013 | Weaver et al. |
| 2015/0231861 | A1 | 8/2015 | Hu et al. |
| 2015/0231862 | A1 | 8/2015 | Hu et al. |
| 2016/0325534 | A1 | 11/2016 | Hu et al. |
| 2017/0008263 | A1 | 1/2017 | Hu et al. |

FOREIGN PATENT DOCUMENTS

| | | | | |
|---|---|---|---|---|
| JP | H10265751 | A | 10/1998 | |
| JP | 2000094604 | A | 4/2000 | |
| JP | 2001059028 | A | 3/2001 | |
| JP | 2001105551 | A | 4/2001 | |
| JP | 2004167823 | A | 6/2004 | |
| JP | 2004299393 | A | 10/2004 | |
| JP | 2004307065 | A | 11/2004 | |
| JP | 2007237641 | A | 9/2007 | |
| JP | 2009143118 | A | 7/2009 | |
| JP | 4953560 | B2 | 6/2012 | |
| WO | 0001745 | A1 | 1/2000 | |
| WO | 0038843 | A1 | 7/2000 | |
| WO | 2009015126 | A1 | 1/2009 | |
| WO | WO-2009015126 | A1 * | 1/2009 | .............. B32B 27/08 |
| WO | WO-2009015126 | A1 * | 1/2009 | .............. B32B 27/08 |
| WO | 2009114797 | A1 | 9/2009 | |
| WO | 2010008696 | A1 | 2/2010 | |
| WO | 2010033276 | A2 | 3/2010 | |
| WO | 2010115312 | A1 | 10/2010 | |
| WO | 2011149886 | A1 | 12/2011 | |
| WO | 2011163187 | A1 | 12/2011 | |
| WO | 2011163191 | A1 | 12/2011 | |
| WO | 2012044730 | A1 | 4/2012 | |
| WO | 2012044732 | A1 | 4/2012 | |
| WO | 2013003541 | A1 | 1/2013 | |
| WO | 2013003543 | A1 | 1/2013 | |
| WO | WO-2013003541 | A1 * | 1/2013 | .............. B32B 27/32 |
| WO | WO-2013003543 | A1 * | 1/2013 | .............. B32B 27/32 |
| WO | 2013090396 | A1 | 6/2013 | |
| WO | 2014043522 | A1 | 3/2014 | |

OTHER PUBLICATIONS

ATTANE Data Sheet.*
International Search Report for International Application No. PCT/US2014/071848; International Filing Date Dec. 22, 2014; Report dated Mar. 12, 2015 (4 pages).
International Search Report for International Application No. PCT/US2015/016536; International Filing Date Feb. 19, 2015; Report dated Apr. 29, 2015 (4 pages).
International Search Report for International Application No. PCT/US2015/016541; International Filing Date Feb. 19, 2015; Report dated Apr. 29, 2015 (4 pages).
International Search Report for International Application No. PCT/US2015/016607; International Filing Date Feb. 19, 2015; Report dated Jun. 16, 2015 (5 pages).
International Search Report for International Application No. PCT/US2015/016610; International Filing Date Feb. 19, 2015; Report dated Apr. 13, 2015 (5 pages).

(56) References Cited

OTHER PUBLICATIONS

International Search Report for International Application Serial No. PCT/CN2014/072260; International Filing Date Feb. 19, 2014; Report dated Oct. 10, 2014 (7 pages).

International Search Report for International Application Serial No. PCT/CN2014/072265; International Filing Date Feb. 19, 2014; Report dated Nov. 28, 2014 (8 pages).

John Dealy et al., "Rheometers for Molten Plastics" Published by Van Nostrand Reinhold Co. (1982) on pp. 97-99.

K.W. Dixon—J. Branderup, E. Immergut, E. Grulke, eds. "Decomposition Rates of Organic Free Radical Initiators" Polymer Handbook, 4th ed., Wiley, New York, 1999, Section II, pp. 1-76.

M. Shida et al. "Correlation of Low Density Polyethylene Rheological Measurments with Optical and Processing Properties" Polymer Engineering and Science, vol. 17, No. 11, p. 769-774 (1977).

Machine Translation of JP 2000-094604 (2000) 6 Pages.

Rosalind Juran, editor "Polypropylene" Modern Plastics Encyclopedia/89, mid Oct. 1988 Issue, vol. 65, No. 11, pp. 86-92.

Rudin, A., "Practical Aspects of Molecular Weight Measurements" Modern Methods of Polymer Characterization, John Wiley & Sons, New York (1991) pp. 103-112.

Written Opinion for International Application No. PCT/US2014/071848; International Filing Date Dec. 22, 2014; Report dated Mar. 12, 2015 (5 pages).

Written Opinion for International Application No. PCT/US2015/016536; International Filing Date Feb. 19, 2015; Report dated Apr. 29, 2015 (5 pages).

Written Opinion for International Application No. PCT/US2015/016541; International Filing Date Feb. 19, 2015; Report dated Apr. 29, 2015 (5 pages).

Written Opinion for International Application No. PCT/US2015/016607; International Filing Date Feb. 19, 2015; Report dated Jun. 16, 2015 (7 pages).

Written Opinion for International Application No. PCT/US2015/016610; International Filing Date Feb. 19, 2015; Report dated Apr. 13, 2015 (7 pages).

Written Opinion for International Application Serial No. PCT/CN2014/072260; International Filing Date Feb. 19, 2014; Report dated Oct. 10, 2014 (4 pages).

Written Opinion for International Serial No. PCT/CN2014/072265; International Filing Date Feb. 19, 2014; Report dated Nov. 28, 2014 (4 pages).

Zimm, G.H. and Stockmayer, W.H., J. "The Dimensions of Chain Molecules Containing Branches and Rings" Chem. Phys., 17, 1301 (1949).

Holden et al.(Translated by Fu, Zhifeng); "Thermoplastic Elastomer"; Chemistry Industry Press, 2000, p. 106—portions translated.

Van Krevelen (Translated by Xu, Yuanze et al.); "Properties of Polymers: Their Estimation and Correlation with Chemical Structure"; Beijing Scientific Publishing Company; 1981; pp. 247-248—relevant portion translated.

Yu et al.; "Synthetic Resin and Plastic Performance Manual"; Beijing Mechanical Industry Publishing House; 2011, p. 64—relevant portion translated.

DOW; "Affinity PL 1880G, Polyolefin Plastomer";Technical Information; Jan. 11, 2012, 3 pages.

\* cited by examiner

HIGH PERFORMANCE SEALABLE CO-EXTRUDED ORIENTED FILM, METHODS OF MANUFACTURE THEREOF AND ARTICLES COMPRISING THE SAME

CROSS REFERENCE TO RELATED APPLICATIONS

This application is a National Stage application of PCT/US2015/016610, filed Feb. 19, 2015, which claims priority to International Application No. PCT/CN2014/072260, filed Feb. 19, 2014, both of which are incorporated by reference in their entirety herein.

BACKGROUND

This disclosure relates to develop high performance sealable oriented film, methods of manufacture thereof and to articles comprising the same.

Co-extruded oriented film products that comprise polypropylene (PP) and polyethylene (PE) are often used for packaging food products. Presently, dry food packaging is dominated by multi-ply dry laminated biaxially oriented polypropylene (BOPP) film, which is usually made by adhesive-laminating a BOPP film with a sealant film like PE and cast PP (CPP) film.

It is desirable to eliminate the lamination process, and replace the laminate with a single ply film while still maintaining the laminate film performance, like seal strength, stiffness and dimensional stability. The co-extruded BOPP films afford poor heat seal performance after biaxial stretching. Due to the lack of the seal strength, the co-extruded BOPP films can only be used to package small articles, articles not requiring high seal strength, and small size and light weight food. There is therefore a need in the food packaging industry to develop a high heat seal strength oriented film to replace the incumbent laminated structure (such as BOPP//CPP and BOPP//PE) to cut cost and eliminate the adhesive involved in the lamination process.

SUMMARY

Disclosed herein is a multilayered film comprising a first layer and a second layer; and a tie layer; where the tie layer comprises a crystalline block composite and where the tie layer is disposed between the first layer and the second layer; the first layer being disposed on a first surface of the tie layer; the second layer being disposed on a second surface of the tie layer; where the second surface is oppositely disposed to the first surface; where the multilayered film is biaxially oriented.

Disclosed herein too is a method of manufacturing a multilayer film comprising coextruding a multilayer film comprising a first layer and a second layer; and a tie layer; where the tie layer comprises a crystalline block composite and where the tie layer is disposed between the first layer and the second layer; the first layer being disposed on a first surface of the tie layer; the second layer being disposed on a second surface of the tie layer; where the second surface is oppositely disposed to the first surface; blowing or casting the multilayered film; and biaxially orienting the film.

DETAILED DESCRIPTION

"Composition" and like terms mean a mixture of two or more materials, such as a polymer which is blended with other polymers or which contains additives, fillers, or the like. Included in compositions are pre-reaction, reaction and post-reaction mixtures the latter of which will include reaction products and by-products as well as unreacted components of the reaction mixture and decomposition products, if any, formed from the one or more components of the pre-reaction or reaction mixture.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend.

"Polymer" means a compound prepared by polymerizing monomers, whether of the same or a different type. The generic term polymer thus embraces the term homopolymer, usually employed to refer to polymers prepared from only one type of monomer, and the term interpolymer as defined below. It also embraces all forms of interpolymers, e.g., random, block, etc. The terms "ethylene/a-olefin polymer" and "propylene/a-olefin polymer" are indicative of interpolymers as described below. It is noted that although a polymer is often referred to as being "made of" monomers, "based on" a specified monomer or monomer type, "containing" a specified monomer content, or the like, this is obviously understood to be referring to the polymerized remnant of the specified monomer and not to the unpolymerized species.

"Interpolymer" means a polymer prepared by the polymerization of at least two different monomers. This generic term includes copolymers, usually employed to refer to polymers prepared from two or more different monomers, and includes polymers prepared from more than two different monomers, e.g., terpolymers, tetrapolymers, etc.

"Polyolefin", "polyolefin polymer", "polyolefin resin" and like terms mean a polymer produced from a simple olefin (also called an alkene with the general formula $C_nH_{2n}$) as a monomer. Polyethylene is produced by polymerizing ethylene with or without one or more comonomers, polypropylene by polymerizing propylene with or without one or more comonomers, etc. Thus, polyolefins include interpolymers such as ethylene-α-olefin copolymers, propylene-α-olefin copolymers, etc.

"Melting Point" as used here (also referred to a melting peak in reference to the shape of the plotted DSC curve) is typically measured by the DSC (Differential Scanning calorimetry) technique for measuring the melting points or peaks of polyolefins as described in U.S. Pat. No. 5,783,638. It should be noted that many blends comprising two or more polyolefins will have more than one melting point or peak; many individual polyolefins will comprise only one melting point or peak.

The term 'and/or' includes both "and" as well as "or". For example, the term A and/or B is construed to mean A, B or A and B.

Disclosed herein is a multilayered film that comprises a plurality of layers and that can be used in applications including flexible packaging, pressure sensitive tape, printing and lamination, stationary, metalizing, flower sleeves, and the like. The multilayered film comprises at least 3 layers, one of which is a tie layer that comprises a crystalline block composite (CBC), optionally a polyolefin based elastomer; optionally a polypropylene and optionally a polyethylene; optionally the blends of polyolefins. The tie layer is used to bond a first layer that comprises polypropylene to a second layer (that is opposedly disposed to the first layer) that comprises a polyethylene, preferably a linear low density polyethylene having a density of less than 0.92 grams per cubic centimeter.

The multilayered film is oriented. It can be unaxially oriented, biaxially oriented or oriented in a plurality of different directions. Orienting the film imparts tensile strength and modulus to the film. In an exemplary embodiment, the film is biaxially oriented.

Figure 1:
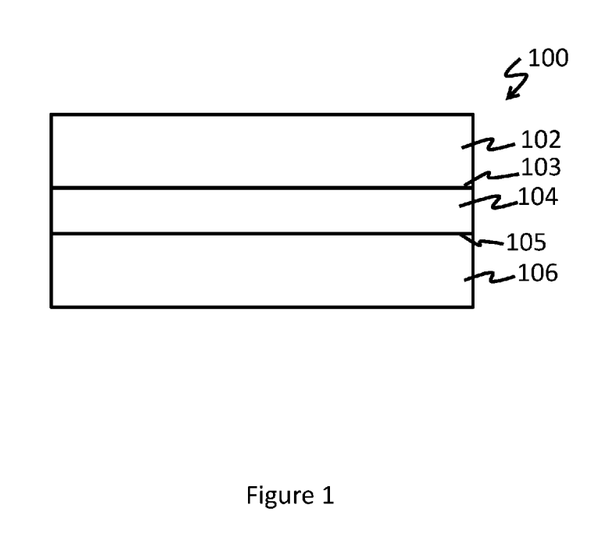
FIG. 1 is a schematic of the multilayer film.

With reference now to the FIG. 1, a multilayer film 100 comprises a first layer 102 (a sealing layer 102), a tie layer 104 and a second layer 106 (also called the base layer 106). The tie layer 104 comprises a first surface 103 and a second surface 105 that are opposedly disposed to each other. The first layer 102 contacts the tie layer 104 at the first surface 103, while the second layer 106 (that is opposedly disposed to the first layer 102) contacts the tie layer 104 at the second surface 105.

As noted above, the tie layer 104 comprises a crystalline block composite (CBC), optionally a polyolefin based elastomer; optionally a polypropylene and optionally a polyethylene.

The term "crystalline block composite" (CBC) refers to polymers having three components: a crystalline ethylene based polymer (CEP) (also referred to herein as a soft polymer), a crystalline alpha-olefin based polymer (CAOP) (also referred to herein as a hard polymer), and a block copolymer comprising a crystalline ethylene block (CEB) and a crystalline alpha-olefin block (CAOB), wherein the CEB of the block copolymer is the same composition as the CEP in the block composite and the CAOB of the block copolymer is the same composition as the CAOP of the block composite. Additionally, the compositional split between the amount of CEP and CAOP will be essentially the same as that between the corresponding blocks in the block copolymer. When produced in a continuous process, the crystalline block composites desirably have a polydispersity index (PDI) from 1.7 to 15, specifically 1.8 to 10, specifically from 1.8 to 5, more specifically from 1.8 to 3.5. Such crystalline block composites are described in, for example, US Patent Application Publication Nos. 2011/0313106, 2011/0313108 and 2011/0313108, all published on Dec. 22, 2011, incorporated herein by reference with respect to descriptions of the crystalline block composites, processes to make them and methods of analyzing them.

The crystalline ethylene polymer (CEP) (i.e., the soft block) comprises blocks of polymerized ethylene units in which any comonomer content is 10 mol % or less, specifically between 0 mol % and 10 mol %, more specifically between 0 mol % and 7 mol % and most specifically between 0 mol % and 5 mol %. The crystalline ethylene polymer has corresponding melting points that are specifically 75° C. and above, specifically 90° C. and above, and more specifically 100° C. and above.

The crystalline alpha-olefin based polymer (CAOP) comprises highly crystalline blocks of polymerized alpha olefin units in which the monomer is present in an amount greater than 90 mol percent, specifically greater than 93 mol percent, more specifically greater than 95 mol percent, and specifically greater than 96 mol percent. In other words, the comonomer content in the CAOPs is less than 10 mol percent, and specifically less than 7 mol percent, and more specifically less than 5 mol percent, and most specifically less than 4 mol %. CAOPs with propylene crystallinity have corresponding melting points that are 80° C. and above, specifically 100° C. and above, more specifically 115° C. and above, and most specifically 120° C. and above. In some embodiments, the CAOP comprise all or substantially all propylene units.

Examples of alpha-olefin units that may be used in the CAOP contain 4 to 10 carbon atoms. Examples of these are 1-butene, 1-hexene, 4-methyl-1-pentene and 1-octene. Preferred diolefins are isoprene, butadiene, 1,4-pentadiene, 1,4-hexadiene, 1,5-hexadiene, 1,7-octadiene, 1, 9-decadiene, dicyclopentadiene, methylene-norbornene, 5-ethylidene-2-norbornene, or the like, or a combination comprising at least one of the foregoing alpha-olefin units.

CAOB refers to highly crystalline blocks of polymerized alpha olefin units in which the monomer is present in an amount greater than 90 mol %, specifically greater than 93 mol %, more specifically greater than 95 mol %, and specifically greater than 96 mol %. In other words, the comonomer content in the CAOBs is less than 10 mol percent, and specifically less than 7 mol %, and more specifically less than 5 mol %, and most specifically less than 4 mol %. CAOBs with propylene crystallinity have corresponding melting points that are 80° C. and above, specifically 100° C. and above, more specifically 115° C. and above, and most specifically 120° C. and above. In some embodiments, the CAOB comprises all or substantially all propylene units. CEB, on the other hand, refers to blocks of polymerized ethylene units in which the comonomer content is 10 mol % or less, specifically between 0 mol % and 10 mol %, more specifically between 0 mol % and 7 mol % and most specifically between 0 mol % and 5 mol %. Such CEB have corresponding melting points that are specifically 75° C. and above, more specifically 90° C., and 100° C. and above.

In one embodiment, the crystalline block composite polymers comprise propylene, 1-butene or 4-methyl-1-pentene and one or more comonomers. Specifically, the block composites comprise in polymerized form propylene and ethylene and/or one or more $C_{4-20}$ α-olefin comonomers, and/or one or more additional copolymerizable comonomers or they comprise 4-methyl-1-pentene and ethylene and/or one or more $C_{4-20}$ α-olefin comonomers, or they comprise 1-butene and ethylene, propylene and/or one or more $C_5$-$C_{20}$ α-olefin comonomers and/or one or more additional copolymerizable comonomers. Additional suitable comonomers are selected from diolefins, cyclic olefins, and cyclic diolefins, halogenated vinyl compounds, and vinylidene aromatic compounds. Preferably, the monomer is propylene and the comonomer is ethylene.

Comonomer content in the crystalline block composite polymers may be measured using any suitable technique, with techniques based on nuclear magnetic resonance (NMR) spectroscopy preferred.

Alternatively or in addition to the CBC (discussed in detail above), certain suitable "block composite" (BC) resins can be employed in the tie layer 104 in the films according to the present invention. As used herein, the terms "block composite" or "block copolymer composite" resins are different from "crystalline block composites" or "crystalline block copolymer composite resins" based on the amount of comonomer polymerized with the ethylene polymer and ethylene block in the composite. The term "BC" refers generally to polymers comprising (i) a soft ethylene copolymer (EP) having polymerized units in which the comonomer content is greater than 10 mol % and having less than 90 mol % polymerized ethylene, and preferably a comonomer content greater than 20 mol % and less than 80 mol % ethylene, and most preferably a comonomer content greater than 33 mol % and less than 75 mol %, (ii) a hard or crystalline α-olefin polymer (CAOP), in which the α-olefin monomer (preferably propylene) is present in an amount of from greater than 90 up to 100 mol percent, and preferably greater than 93 mol percent, and more preferably greater than 95 mol percent, and most preferably greater than 98 mol percent and (iii) a block copolymer, preferably a diblock, having a soft segment and a hard segment, wherein the hard segment of the block copolymer is essentially the same composition as the hard α-olefin polymer in the block composite and the soft segment of the block copolymer is essentially the same composition as the soft ethylene copolymer of the block composite. The block copolymers can be linear or branched. More specifically, when produced in a continuous process, the block composites desirably possess PDI from 1.7 to 15, preferably from 1.8 to 3.5, more preferably from 1.8 to 2.2, and most preferably from 1.8 to 2.1. When produced in a batch or semi-batch process, the block composites desirably possess PDI from 1.0 to 2.9, preferably from 1.3 to 2.5, more preferably from 1.4 to 2.0, and most preferably from 1.4 to 1.8. Such block composites are described in, for example, US Patent Application Publication Nos. US2011-0082257, US2011-0082258 and US2011-0082249, all published on Apr. 7, 2011 and incorporated herein by reference with respect to descriptions of the block composites, processes to make them and methods of analyzing them.

The specific suitable "BC's" comprise a soft ethylene copolymer (EP) having the comonomer content greater than 80 mol % and up to 90 mol % and preferably greater than 85 mol % and most preferably greater than 87 mol %, but otherwise a BC as generally described herein.

The block composites and crystalline block composites have a melting point $T_m$ greater than 100° C. specifically greater than 120° C., and more specifically greater than 125° C. In an embodiment, the $T_m$ is in the range of from 100° C. to 250° C., more specifically from 120° C. to 220° C. and also specifically in the range of from 125° C. to 220° C. Specifically the melt flow ratio (MFR) of the block composites and crystalline block composites is from 0.1 to 1000 dg/min, more specifically from 0.1 to 50 dg/min and more specifically from 0.1 to 30 dg/min.

In an embodiment, the block composites and crystalline block composites have a weight average molecular weight (Mw) from 10,000 to about 2,500,000 grams per mole (g/mole), specifically from 35000 to about 1,000,000 and more specifically from 50,000 to about 300,000, specifically from 50,000 to about 200,000 g/mole. The sum of the weight percents of soft copolymer, hard polymer and block copolymer equals 100%.

In an embodiment, the crystalline block composite polymers comprise from 0.5 to 95 wt % CEP, from 0.5 to 95 wt % CAOP and from 5 to 99 wt % block copolymer. More preferably, the crystalline block composite polymers comprise from 0.5 to 79 wt % CEP, from 0.5 to 79 wt % CAOP and from 20 to 99 wt % block copolymer and more preferably from 0.5 to 49 wt % CEP, from 0.5 to 49 wt % CAOP and from 50 to 99 wt % block copolymer. Weight percents are based on total weight of crystalline block composite. The sum of the weight percents of CEP, CAOP and block copolymer equals 100%.

Preferably, the block copolymers of the invention comprise from 5 to 95 weight percent crystalline ethylene blocks (CEB) and 95 to 5 wt % crystalline alpha-olefin blocks (CAOB). They may comprise 10 wt % to 90 wt % CEB and 90 wt % to 10 wt % CAOB. More preferably, the block copolymers comprise 25 to 75 wt % CEB and 75 to 25 wt % CAOB, and even more preferably they comprise 30 to 70 wt % CEB and 70 to 30 wt % CAOB.

In some embodiments, the crystalline block composites have a Crystalline Block Composite Index (CBCI) that is greater than zero but less than about 0.4 or from 0.1 to 0.3. In other embodiments, CBCI is greater than 0.4 and up to 1.0. In some embodiments, the CBCI is 0.1 to 0.9, from about 0.1 to about 0.8, from about 0.1 to about 0.7 or from about 0.1 to about 0.6. Additionally, the CBCI can be in the range of from about 0.4 to about 0.7, from about 0.5 to about 0.7, or from about 0.6 to about 0.9. In some embodiments, CBCI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, CBCI is in the range of from about 0.4 to up to about 1.0, from about 0.5 to up to about 1.0, or from about 0.6 to up to about 1.0, from about 0.7 to up to about 1.0, from about 0.8 to up to about 1.0, or from about 0.9 to up to about 1.0.

The crystalline block composite is present in an amount of 10 to 100 weight percent (wt %), specifically 30 to 100 wt %, and more specifically 50 to 100 wt %, based on the total weight of the tie layer 104. The tie layer 104 may also comprise in addition to the crystalline block composite (CBC) an optional elastomer. The optional elastomer can be an ethylene-α-olefin copolymer (which is already detailed above), homogeneously branched ethylene-α-olefin copolymer, a polyolefin elastomer (e.g., a propylene based elastomer), a vinyl aromatic block copolymer, or the like, or a combination comprising at least one of the foregoing elastomers.

The polyolefin elastomers may also comprise random or block propylene polymers (i.e., polypropylenes). The random polypropylene elastomer typically comprises 90 or more mole percent units derived from propylene. The remainder of the units in the propylene copolymer is derived from units of at least one α-olefin.

The α-olefin component of the propylene copolymer is preferably ethylene (considered an α-olefin for purposes of this invention) or a $C_{4-20}$ linear, branched or cyclic α-olefin. Examples of $C_{4-20}$ α-olefins include 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, certain cyclic olefins, such as norbornene and related olefins, particularly 5-ethylidene-2-norbornene, are α-olefins and can be used in place of some or all of the α-olefins described above. Similarly, styrene and its related olefins (for example, α-methylstyrene, and the like) are α-olefins for purposes of this invention. Illustrative random propylene copolymers include but are not limited to propylene/ethylene, propylene/1-butene, propylene/1-hexene, propylene/1-octene, and the like. Illustrative terpolymers include ethylene/propylene/1-octene, ethylene/propylene/1-butene, and ethylene/propylene/diene monomer (EPDM).

In one embodiment the random polypropylene copolymer has a $T_m$ greater than 120° C., and/or a heat of fusion greater than 70 J/g (both measured by DSC) and preferably, but not necessarily, made via Ziegler-Natta catalysis.

In another embodiment, the polyolefin elastomer is a propylene-α-olefin interpolymer and is characterized as having substantially isotactic propylene sequences. The propylene-α-olefin interpolymers include propylene-based elastomers (PBE). "Substantially isotactic propylene sequences" means that the sequences have an isotactic triad (mm) measured by $^{13}$C NMR of greater than 0.85; in the alternative, greater than 0.90; in another alternative, greater than 0.92; and in another alternative, greater than 0.93. Isotactic triads are well-known in the art and are described in, for example, U.S. Pat. No. 5,504,172 and International Publication No. WO 00/01745, which refers to the isotactic sequence in terms of a triad unit in the copolymer molecular chain determined by $^{13}$C NMR spectra.

The propylene-α-olefin copolymer comprises units derived from propylene and polymeric units derived from one or more α-olefin comonomers. Exemplary comonomers utilized to manufacture the propylene-α-olefin copolymer are $C_2$ and $C_4$ to $C_{10}$ α-olefins; for example, $C_2$, $C_4$, $C_6$ and $C_8$ α-olefins.

The propylene-α-olefin interpolymer comprises 1 to 40 percent by weight of one or more alpha-olefin comonomers. The propylene-α-olefin interpolymer may have a melt flow rate in the range of 0.1 to 500 grams per 10 minutes (g/10 min), measured in accordance with ASTM D-1238 (at 230° C./2.16 Kg). The propylene-α-olefin interpolymer has crystallinity in the range of from at least 1 percent by weight (a heat of fusion ($H_f$) of at least 2 Joules/gram (J/g)) to 30 percent by weight (a $H_f$ of less than 50 J/g). The propylene-α-olefin interpolymer has a density of typically less than 0.895 g/cm$^3$. The propylene-α-olefin interpolymer has a melting temperature ($T_m$) of less than 120° C. and a heat of fusion ($H_f$) of less than 70 Joules per gram (J/g) as measured by differential scanning calorimetry (DSC) as described in U.S. Pat. No. 7,199,203. The propylene-α-olefin interpolymer has a molecular weight distribution (MWD), defined as weight average molecular weight divided by number average molecular weight (Mw/Mn) of 3.5 or less; or 3.0 or less; or from 1.8 to 3.0.

Such propylene-α-olefin interpolymers are further described in the U.S. Pat. Nos. 6,960,635 and 6,525,157, the entire contents of which are incorporated herein by reference. Such propylene-α-olefin interpolymers are commercially available from The Dow Chemical Company, under the trade name VERSIFY™, or from ExxonMobil Chemical Company, under the trade name VISTAMAXX™.

The tie layer 104 may also comprise homogeneously branched ethylene-α-olefin copolymers. These copolymers are elastomeric and can be made with a single-site catalyst such as a metallocene catalyst or constrained geometry catalyst, and typically have a melting point of less than 105, specifically less than 90, more specifically less than 85, even more specifically less than 80 and still more specifically less than 75° C. The melting point is measured by differential scanning calorimetry (DSC) as described, for example, in U.S. Pat. No. 5,783,638. The α-olefin is preferably a $C_{3-20}$ linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane.

Illustrative homogeneously branched ethylene-α-olefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, and ethylene/butene/styrene. The copolymers can be random copolymers or block copolymers.

Examples of commercially available homogeneously branched ethylene-α-olefin interpolymers useful in the tie layer 104 includes homogeneously branched, linear ethylene-α-olefin copolymers (e.g. TAFMER™ by Mitsui Petrochemicals Company Limited and EXACT® by Exxon Chemical Company), and the homogeneously branched, substantially linear ethylene-α-olefin polymers (e.g., AFFINITY™ and ENGAGE™ polyethylene available from the Dow Chemical Company). An exemplary ethylene-α-olefin copolymer that may be used in the tie layer 104 is AFFINITY EG 8100G, commercially available from the Dow Chemical Company.

The term vinyl aromatic block copolymer means a polymer having at least one block segment of a vinyl aromatic monomer in combination with at least one saturated or unsaturated elastomeric monomer segment, and more preferably not having a block of polymer that is neither elastomeric nor vinyl aromatic. Examples of vinyl aromatic block copolymers are "styrene block copolymer or styrenic block copolymer". The term "styrene block copolymer" or "styrenic block copolymer" means a polymer having at least one block segment of a styrenic monomer in combination with at least one saturated or unsaturated elastomer (rubber) monomer segment, and more preferably not having a block of polymer that is neither rubber or styrenic. Suitable styrene block copolymers having unsaturated rubber monomer units include styrene-butadiene (SB), styrene-isoprene (SI), styrene-butadiene-styrene (SBS), styrene-isoprene-styrene (SIS), α-methylstyrene-butadiene-α-methylstyrene, α-methylstyrene-isoprene-α-methylstyrene, and the like.

The term "styrene butadiene block copolymer" is used herein inclusive of SB, SBS and higher numbers of blocks of styrene (S) and butadiene (B). Similarly, the term "styrene isoprene block copolymer" is used inclusive of polymers having at least one block of styrene and one of isoprene (I). The structure of the styrene block copolymers can be of the linear or radial type, and of the diblock, triblock or higher block type. In some embodiments, the styrenic block copolymers having at least four different blocks or a pair of two repeating blocks, for example, repeating styrene/butadiene or styrene/ethylene propylene blocks, are desirable. Styrene block copolymers are commercially available from Dexco Polymers under the trademark VECTOR™, from KRATON Polymers under the trademark KRATON™, from Chevron Phillips Chemical Co. under the trademark SOLPRENE™ and K-Resin, and from BASF Corp. under the trade designation STYROLUX™. The styrene block copolymers are optionally used singly or in combinations of two or more.

The styrenic portion of the block copolymer is preferably a polymer or interpolymer of styrene or its analogs or homologs, including α-methylstyrene, and ring-substituted styrenes, particularly ring-methylated styrenes. Preferred styrenics are styrene and α-methylstyrene, with styrene being especially preferred.

The elastomer portion of the styrenic block copolymer is optionally either unsaturated or saturated. Block copolymers with unsaturated elastomer monomer units may comprise homopolymers of butadiene or isoprene and copolymers of one or both of these two dienes with a minor amount of styrenic monomer. When the monomer employed is butadiene, it is preferred that between about 35 and about 55 mole percent of the condensed butadiene units in the butadiene polymer block have a 1,2-configuration. When such a block is hydrogenated, the resulting product is, or resembles, a regular copolymer block of ethylene and 1-butene (EB). If the conjugated diene employed is isoprene, the resulting hydrogenated product is or resembles a regular copolymer block of ethylene and propylene (EP). Preferred block copolymers have unsaturated elastomer monomer units, more preferably including at least one segment of a styrenic unit and at least one segment of butadiene or isoprene, with SBS and SIS most preferred. Among these, SIS is preferred because it has been found to be particularly effective to compatibilize polypropylene with other polymers in the composition. Furthermore, it is preferred because of a lower tendency to crosslink forming gels during manufacture as compared to SBS. Styrene butadiene block copolymers are alternatively preferred when a cast tenter line is used in manufacturing a film when its higher clarity and lower haze are advantageous.

Elastomeric styrene block copolymers provide toughness and lower stiffness than would be obtained in the absence of the block copolymer. Elastomeric behavior is indicated by a property of tensile percent elongation at break of advantageously at least about 200, specifically at least about 220, more specifically at least about 240, most specifically at least about 260 and specifically at most about 2000, more specifically at most about 1700, most specifically at most about 1500 percent as measured by the procedures of ASTM D412 and/or ASTM D882. Industrially, most polymers of this type contain 10 to 80 wt % styrene. Within a specific type and morphology of polymer, as the styrene content increases the elastomeric nature of the block copolymer decreases.

The block copolymers desirably have a melt flow rate (MFR) of at least about 2, specifically at least about 4 grams per 10 minutes (g/10 min), specifically 20 g/10 min, and more specifically 30 g/10 min. Measure MFR according to ASTM method D1238 Condition G.

Preferred styrenic block copolymers include styrene-isoprene-styrene block copolymers ("SIS"), styrene-butadiene-styrene block copolymers ("SBS"), styrene-ethylene-propylene block copolymers ("SEP"), and hydrogenated styrenic block copolymer such as styrene-(ethylene butylene)-styrene block copolymers ("SEBS") (e.g., the SEBS commercially available from Kraton Polymers LLC under the trade designation KRATON™ 1657). Preferably, the styrenic block copolymer used in the tie layer is SBS.

In one embodiment, the styrene butadiene block copolymer has a radial or star block configuration with polybutadiene at the core and polystyrene at the tips of the arms. Such polymers are referred to herein as star styrene butadiene block copolymers and are within the skill in the art and commercially available from Chevron Phillips Chemical Co. under the trade designation K-Resin. These polymers contain about 27% butadiene or more in a star-block form and often feature a bimodal molecular weight distribution of polystyrene. The inner polybutadiene segments are of about the same molecular weight while the outer polystyrene segments are of different molecular weight. This feature facilitates control of polybutadiene segment thickness, to obtain improved clarity. For high clarity, the polybutadiene segment thickness is preferably about one-tenth of the wavelength of visible spectrum or less.

The ethylene-α-olefin copolymer has been described above as has the polyethylene and will not be detailed again. The polypropylene will be detailed below with reference to the layer 106.

If the elastomer is used, it is present in amounts of up to 60 wt %, specifically 5 to 40 wt %, based on the total weight of the tie layer 104.

The tie layer 104 may also optionally comprise polyethylene or polypropylene. The optional polyethylene is selected from ultralow density polyethylene (ULDPE), low density polyethylene (LDPE), linear low density polyethylene (LLDPE), medium density polyethylene (MDPE), high density polyethylene (HDPE), high melt strength high density polyethylene (HMS-HDPE), ultrahigh density polyethylene (UHDPE), or combinations thereof.

The optional polyethylene and/or the optional polypropylene are present in the tie layer 104 in an amount of up to 60 wt %, specifically 10 to 40 wt %, based on the total weight of the tie layer 104.

The tie layer 104 has a thickness of 1 to 40 micrometers, specifically 1 to 20 micrometers, more specifically 1 to 10 micrometers. The tie-layer 104 has a thickness of 1 to 50%, specifically 2 to 25%, more specifically 2 to 20% of the total thickness of the multilayer film.

The first layer 102 (also called the sealing layer 102) comprises polyethylene. The polyethylene is selected from ultralow density polyethylene (ULDPE), low density polyethylene (LDPE), linear low density polyethylene (LLDPE), medium density polyethylene (MDPE), high density polyethylene (HDPE), high melt strength high density polyethylene (HMS-HDPE), ultrahigh density polyethylene (UHDPE), or combinations thereof.

In an exemplary embodiment, the first layer 102 comprises linear low density polyethylene (LLDPE). LLDPE is a copolymer (also referred to as an interpolymer) of ethylene and an α-olefin having 3 to 12 carbon atoms, specifically 4 to 8 carbon atoms (e.g., propene, 1 butene, 4-methyl-1-pentene, 1-hexene, 1 octene, 1-decene, and the like), that has sufficient α-olefin content to reduce the density of the copolymer to that of LDPE. The term "LLDPE", includes both—resin manufactured using the traditional Ziegler-Natta catalyst systems as well as single-site catalysts such as metallocenes (sometimes referred to as "m-LLDPE"). LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the processes disclosed in U.S. Pat. No. 4,076,698; and/or blends thereof (such as those disclosed in U.S. Pat. Nos. 3,914,342 or 5,854,045). The LLDPE can be made by any process such as gas phase polymerization, solution phase polymerization, slurry polymerization or combinations thereof.

In one embodiment, the LLDPE used in the first layer 102 comprises the linear low density polyethylene having a melt index $I_2$ of 0.25 to 20 g/10 minutes when measured as per ASTM D 1238 at 190° C. and 2.16 kg, and a density of less than 0.930 grams per square centimeter (measured as per ASTM D 792). An exemplary LLDPE for use in the outer layer 102 is ELITE™ 5230, which is an ethylene-octene copolymer with melt index of 4.0 g/10 min (measured as per ASTM D1238 at 190° C. and 2.16 kg), density 0.916 g/cc (measured as per ASTM D 792), and commercially available from The Dow Chemical Company. Other exemplary LLDPE's that can be used in the outer layers 102 and 110 are linear ethylene-based polymers such as DOWLEX™ Polyethylene Resins, ELITE™ and ELITE AT™ brand enhanced polyethylene resin, all available from The Dow Chemical Company, and Exceed™ metallocene polyethylenes, available from ExxonMobil Chemical Company.

Another exemplary polyethylene for use in the outer layers is homogeneously branched ethylene-α-olefin copolymers. These copolymers can be made with a single-site catalyst such as a metallocene catalyst or constrained geometry catalyst, and typically have a melting point of less than 105, specifically less than 90, more specifically less than 85, even more specifically less than 80 and still more specifically less than 75° C. The melting point is measured by differential scanning calorimetry (DSC) as described, for example, in U.S. Pat. No. 5,783,638. The α-olefin is preferably a $C_{3-20}$ linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane.

Illustrative homogeneously branched ethylene-α-olefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, and ethylene/butene/styrene. The copolymers can be random copolymers or block copolymers.

Examples of commercially available homogeneously branched ethylene-α-olefin interpolymers useful in the outer layers 102 include homogeneously branched, linear ethylene-α-olefin copolymers (e.g. TAFMER® by Mitsui Petrochemicals Company Limited and EXACT® by Exxon Chemical Company), and the homogeneously branched, substantially linear ethylene-α-olefin polymers (e.g., AFFINITY™ and ENGAGE™ polyethylene available from the Dow Chemical Company). Blends of any of these interpolymers can also be used in the outer layers 102 and 110. An exemplary blend is AFFINITY PL1880G commercially available from The Dow Chemical Company.

Propylene-α-olefin interpolymers can also be used as the first layer 102 (sealant layer) with preferred melting points 90 to 145° C.

The first layer 102 (i.e., the sealing layer) has a thickness of 1 to 60 micrometers, specifically 1 to 20 micrometers, more specifically 1 to 10 micrometers. The first layer 102 has a thickness of 1 to 50%, specifically 2 to 25%, more specifically 5 to 25% of the total thickness of the multilayer film.

The second layer 106 (also called the base layer 106) comprises polypropylene. The polypropylene is selected from random copolymer polypropylene (rcPP), impact copolymer polypropylene (hPP+at least one elastomeric impact modifier) (ICPP) or high impact polypropylene (HIPP), high melt strength polypropylene (HMS-PP), isotactic polypropylene (iPP), syndiotactic polypropylene (sPP), or a combination comprising at least one of the foregoing polypropylenes.

The polypropylene is generally in the isotactic form of homopolymer polypropylene, although other forms of polypropylene can also be used (e.g., syndiotactic or atactic). Polypropylene impact copolymers (e.g., those wherein a secondary copolymerization step reacting ethylene with the propylene is employed) and random copolymers (also reactor modified and usually containing 1.5-7% ethylene copolymerized with the propylene), however, can also be used in the layer 106. A complete discussion of various polypropylene polymers is contained in Modern Plastics Encyclopedia/89, mid October 1988 Issue, Volume 65, Number 11, pp. 86-92, the entire disclosure of which is incorporated herein by reference. The molecular weight and hence the melt flow rate of the polypropylene for use in the present invention varies depending upon the application. The melt flow rate for the polypropylene useful herein is generally from about 0.1 grams/10 minutes (g/10 min, measured as per ASTM D1238 at 230° C. and 2.16 kg) to about 100 g/10 min specifically 0.5 g/10 min to about 80 g/10 min, and specifically 4 g/10 min to about 70 g/10 min. The propylene polymer can be a polypropylene homopolymer, or it can be a random copolymer or even an impact copolymer (which already contains a rubber phase). The polypropylene may be produced by using Ziegler-Natta or metallocene catalysts. Examples of such propylene polymers include ExxonMobil™ hPP 4712E1 (made by Exxon Mobil), hPP H03G-05 (made by Ineos) and, MOPLEN and PROFAX (made by Lyondell Basell).

The second layer 106 may contain polypropylene in an amount of 40 to 100 wt %, specifically 60 to 100 wt %, based on the total weight of the second layer 106.

The second layer 106 may optionally contain an elastomer in an amount of up to 40 wt %, specifically 10 to 35 wt %, based on the total weight of the second layer. The elastomer can be an ethylene-α-olefin copolymer (which is already detailed above), a polyolefin elastomer (e.g., a propylene based elastomer), a vinyl aromatic block copolymer, or a combination thereof (as already detailed above). The second layer 106 may also contain polyethylene in an amount of up to 40 wt %, specifically 10 to 35 wt %, based on the total weight of the second layer. The polyethylenes have been described above, and will not be detailed here again.

The second layer 106 (i.e., the base layer) has a thickness of 10 to 110 more preferably from 10 to 70 more preferably from 10 to 40 μm. The second layer 106 has a thickness of 50 to 90%, specifically 60 to 85%, based on the total thickness of the multilayered film 100. In an exemplary embodiment, the second layer has a thickness that is at least 66% of the total thickness of the multilayered film.

Each layer of the multilayer film 100 may contain other additives such as waxes, antioxidants, antiozonants, mold release agents, biocides, thermal stabilizers, pigments, dyes, infrared absorption agents, ultraviolet stabilizers, or the like, or a combination comprising at least one of the foregoing additives.

One of more layers of the multilayer film can optionally comprise a wax that may reduce the melt viscosity in addition to reducing costs. Non-limiting examples of suitable waxes include petroleum waxes, polyolefin waxes such as low molecular weight polyethylene or polypropylene, synthetic waxes, paraffin and microcrystalline waxes having melting points from about 55 to about 110° C., Fischer-Tropsch waxes, or a combination comprising at least one of the foregoing waxes. In some embodiments, the wax is a low molecular weight polyethylene homopolymer or interpolymer having a number average molecular weight of about 400 to about 6,000 g/mole.

In further embodiments, each of the layers of the multilayer film can optionally comprise an antioxidant or a stabilizer. Non-limiting examples of suitable antioxidants include amine-based antioxidants such as alkyl diphenylamines, phenyl-α-naphthylamine, alkyl or aralkyl substituted phenyl-α-naphthylamine, alkylated p-phenylene diamines, tetramethyl-diaminodiphenylamine and the like; and hindered phenol compounds such as 2,6-di-t-butyl-4-methyl-phenol; 1,3,5-trimethyl-2,4,6-tris(3',5'-di-t-butyl-4'-hydroxybenzyl)benzene; tetrakis[(methylene(3,5-di-t-butyl-4-hydroxyhydrocinnamate)]methane (e.g., IRGANOX™ 1010, from Ciba Geigy, New York); octadecyl-3,5-di-t-butyl-4-hydroxycinnamate (e.g., IRGANOX™ 1076, commercially available from Ciba Geigy) and combinations thereof. Where used, the amount of the antioxidant in the composition can be up to about 1 wt %, specifically 0.05 to 0.75 wt %, specifically 0.1 to 0.5 wt %, based on the total weight of any particular layer.

In further embodiments, the compositions disclosed herein optionally can comprise an UV stabilizer that may prevent or reduce the degradation of the compositions by UV radiation. Non-limiting examples of suitable UV stabilizers include benzophenones, benzotriazoles, aryl esters, oxanilides, acrylic esters, formamidine carbon black, hindered amines, nickel quenchers, hindered amines, phenolic antioxidants, metallic salts, zinc compounds, or the like, or a combination comprising at least one of the foregoing UV stabilizers. Where used, the amount of the UV stabilizer in any particular layer can be from about greater than 0 to about 1 wt %, specifically 0.05 to 0.75 wt %, and specifically 0.1 to 0.5 wt %, based on the total weight of a particular layer.

In further embodiments, the compositions disclosed herein optionally can comprise a colorant or pigment. Any colorant or pigment known to a person of ordinary skill in the art may be used in the adhesion composition disclosed herein. Non-limiting examples of suitable colorants or pigments include inorganic pigments such as titanium dioxide and carbon black, phthalocyanine pigments, and other organic pigments such as IRGAZIN®, CROMOPHTAL®, MONASTRAL®, CINQUASIA®, IRGALITE®, ORASOL®, all of which are available from Ciba Specialty Chemicals, Tarrytown, N.Y. Where used, the amount of the colorant or pigment in any particular layer can be present in an amount of up to 10 wt %, specifically 0.1 to 5 wt %, and more specifically 0.5 to 2 wt %, based on the total weight of any particular layer of the multilayered film.

In further embodiments, the compositions disclosed herein optionally can comprise polymeric processing aids (such as Dynamar™ 5911 from Dyneon Corporation), antiblocks and slip additives. These additives may advantageously be used to reduce stickiness in machine direction orientation (MDO) during process and modify coefficient of friction to desired levels for ease of handling.

In one embodiment, in one method of manufacturing the film 100, the respective compositions for each of the layers 102, 104, and 106 of the multilayered film 100 is fed to a separate device in which it is subjected to shear, extensional and elongational forces. The device that exerts the foregoing forces on the composition can be conducted in an extruder (single screw or twin screw), a Henschel mixer, a Waring blender, a Buss Kneader, a Banbury, a roll mill (two or more rolls), high shear impeller disperser, dough mixer, or the like. The ingredients for any layer in the multilayered film may be dry mixed or solution blended in either a Henschel mixer, a Waring blender, a high shear impeller disperser, or the like, prior to being extruded.

In an exemplary embodiment, the compositions for each of the respective layers are fed to separate extruders. The composition for the first layer 102 is fed to a first extruder, the composition for the tie layer 104 is fed to a second extruder, and the composition for the third layer 106 is fed to a third extruder. The compositions from the respective extruders are fed to a single die and are coextruded to form the multilayered film. In an embodiment, the multilayered film after being coextruded is laminated in a roll mill having two or more rolls.

In another embodiment, in another method of manufacturing the multilayered film, each layer may be extruded separately, and the extruded layers may then be formed into a laminate (such as extrusion lamination, thermal lamination, compression molding, adhesive lamination). The compression molding or lamination can be conducted in a roll mill, or in a compression molding press or a laminator.

As detailed above, a plurality of multilayered films may be laminated together to form a single multilayered film. When two or more multilayered films are laminated together, at least one of the common layers may be omitted if desired. For example, if two multilayered films are laminated together, then at least one of the second layers 106 may be omitted. Thus while a single multilayered film contains 3 layers, two multilayered films laminated together will contain 5 layers, and three multilayered films will contain 7 layers.

The multilayered film may be oriented using a double bubble process or in a tenter framing process.

The film may be unaxially oriented or biaxially oriented. In an exemplary embodiment, the film is biaxially oriented in the double bubble process and/or in the tenter framing process. In an embodiment, the film may be subjected to an extension ratio of 2 to 20, specifically 3 to 15 and more specifically 4 to 10 in the machine direction (the direction in which it flows out of an extruder or a roll mill) after being extruded or subjected to roll milling. In another embodiment, the film may be subjected to an extension ratio of 2 to 20, specifically 3 to 15 and more specifically 4 to 10 in the transverse direction (the transverse direction is perpendicular to the machine direction) after being extruded or subjected to roll milling. In an embodiment, the multilayer film is oriented using an extension ratio that is greater in the transverse direction than in the machine direction. In an exemplary embodiment, the multilayer film is oriented by using an extension ratio that is at least 50% greater, specifically at least 75% greater, and more specifically at least 100% greater in the transverse direction than in the machine direction. In another exemplary embodiment, the draw ratio is 4 (MDO) by 10 (TDO).

Preferably the multilayered film 100 has a total thickness from 10 to 120 μm, more preferably from 10 to 80 more preferably from 10 to 50 μm.

Preferably the second layer 106 in the film 100 has a thickness from 10 to 110 μm, more preferably from 10 to 70 μm, more preferably from 10 to 40 μm.

Preferably the first layer (sealant layer) 102 in the film 100 has a thickness from 1 to 40 μm, more preferably from 1 to 20 μm, more preferably from 1 to 10 μm.

Preferably the tie layer 104 has a thickness from 1 to 40 μm, more preferably from 1 to 20 μm, more preferably from 1 to 10 μm.

The multilayered films disclosed herein exhibit a high heat seal strength, preferably greater than 10 N/25 mm, more preferably equal to or greater than 15 N/25 mm, for a film of 30 μm thickness. The preferred films of the present invention also exhibit low heat initiation temperature, such as less than or equal to 110° C. Additionally, the preferred films of the present invention possess good optical clarity and mechanical properties. Accordingly, the preferred films of the present invention can meet the heat seal and other performance requirements for food packaging market.

The multilayered films disclosed herein and the method of manufacturing the films are exemplified in the following examples.

EXAMPLES

This example was conducted to demonstrate the method of manufacturing the multilayer films disclosed herein as well as the properties of these films. The lab scale films were prepared from a thick casted co-extrusion sheet. The three layer sheet with designed layer ratio and thickness (total thickness 960 micrometers) were fabricated on a Dr. Collin GmbH co-extrusion line equipped with three extruders. The processing temperature was set at around 200 to 260° C. with melt temperature at around 240° C. The extrudate was cooled by chilling rolls set at 30° C. The sheets were then biaxially oriented in a simultaneous mode with stretch ratio 4 MD×8 TD on a AccuPull Laboratory Film Stretcher at stretching temperature around 155° C. The final film thickness after stretching is 20 to 30 micrometers.

Table 1 reflects the various compositions used in these examples.

TABLE 1

| Identification | Properties |
|---|---|
| CBC1 | Crystalline block composite, 6.8 MFR, density 0.904 g/cm$^3$ |
| CBC2 | Crystalline block composite, 4.9 MFR, density 0.904 g/cm$^3$ |
| CBC3 | Crystalline block composite 1.4 MFR, density 0.912 g/cm$^3$ |
| BC1 | Block composite, 4.8 MFR, density 0.904 g/cm$^3$ |
| homo-PP (h-PP) | PP T28FE, 2.8 MFR, density 0.900 g/cm$^3$, available from LyondellBasell Industries |
| Ter-PP | Adsyl 5C37, 5.5 MFR, density 0.900 g/cm$^3$, available from LyondellBasell Industries |
| VERSIFY ™ 3000 | 8.0 MFR, density 0.891 g/cm$^3$ |
| ELITE ™ 5230 | 4.0 MI, density 0.916 g/cm$^3$, available from the Dow Chemical Company |
| AFFINITY ™ EG 8100G | 1.0 MI, density 0.870 g/cm$^3$, available from the Dow Chemical Company |

Table 2 shows the composition of crystalline block composite samples CBC1, CBC2, and CBC3 and of block composite sample BC1.

the first reactor according to the process conditions outlined in Table 1. Then, the first reactor contents, as described in Table 1A, below, are flowed to a second reactor in series. Additional Catalyst, Cocatalyst-1, and Cocatalyst-2 are added to the second reactor.

Catalyst-1 ([[rel-2',2''-[(1R,2R)-1,2-cylcohexanediylbis(methyleneoxy-κO)]bis[3-(9H-carbazol-9-yl)-5-methyl[1,1'-biphenyl]-2-olato-κO]](2-)]dimethyl-hafnium) and Cocatalyst-1, a mixture of methyldi($C_{14-18}$alkyl)ammonium salts of tetrakis(pentafluorophenyl)borate, prepared by reaction of a long chain trialkylamine (Armeen™ M2HT, available from Akzo-Nobel, Inc.), HCl and Li[B($C_6F_5$)$_4$], substantially as disclosed in U.S. Pat. No. 5,919,983, Ex. 2., are purchased from Boulder Scientific and used without further purification.

CSA-1 (diethylzinc or DEZ) and cocatalyst-2 (modified methylalumoxane (MMAO)) are purchased from Akzo Nobel and used without further purification. The Solvent for the polymerization reaction is a hydrocarbon mixture (ISOPAR® E) obtainable from ExxonMobil Chemical Company and purified through beds of 13-X molecular sieves prior to use.

The process conditions for producing CBC1, CBC2, and CBC3 are shown in Table 2A.

TABLE 2A

| | Material | | | | | |
|---|---|---|---|---|---|---|
| | CBC1 | | CBC2 | | CBC3 | |
| | Reactor | | | | | |
| | 1st Reactor | 2nd Reactor | 1st Reactor | 2nd Reactor | 1st Reactor | 2nd Reactor |
| Reactor Control Temp. (° C.) | 141 | 135 | 140 | 115 | 140 | 125 |
| Solvent Feed (lb/hr) | 242 | 245 | 144 | 360 | 289 | 130 |
| Propylene Feed (lb/hr) | 5.44 | 48.76 | 3.42 | 69.17 | 4.6 | 25 |
| Ethylene Feed (lb/hr) | 47.0 | 0.0 | 28.0 | 0.0 | 56 | 0 |
| Hydrogen Feed SCCM) | 9.5 | 0.0 | 9.6 | 9.6 | 10 | 10 |
| Reactor Propylene Conc. (g/L) | 3.57 | 2.26 | 1.99 | 2.03 | 0.71 | 2.0 |
| Catalyst Efficiency (gPoly/gM) * 1.0E6 | 0.706 | 0.075 | 0.581 | 0.146 | 0.9 | 0.13 |
| Catalyst Flow (lb/hr) | 0.47 | 1.78 | 0.36 | 0.93 | 1.1 | 0.49 |
| Catalyst Conc. (ppm) | 150 | 500 | 150 | 500 | 60 | 385 |
| Cocatalyst-1 Flow (lb/hr) | 1.41 | 1.12 | 0.36 | 0.58 | 1.47 | 0.26 |
| Cocatalyst-1 Conc. (ppm) | 500 | 8000 | 2000 | 8000 | 600 | 6000 |
| Cocatalyst-2 Flow (lb/hr) | 1.18 | 0.75 | 0.75 | 15.02 | 0.59 | 0 |
| Cocatatlyst-2 Conc. (ppm) | 1993 | 1993 | 1993 | 1797 | 3995 | 0 |
| DEZ Flow (lb/hr) | 1.89 | 0 | 1.20 | 0 | 1.25 | 0 |
| DEZ Conc. (ppm) | 30000 | 0 | 30000 | 0 | 50000 | 0 |

TABLE 2

| Sample | wt % EP | wt % iPP | Wt % $C_2$* in EP |
|---|---|---|---|
| CBC1 | 50 | 50 | 90 |
| CBC2 | 31 | 69 | 90 |
| CBC3 | 70 | 30 | 90 |
| BC1 | 40 | 60 | 65 |

*C2 - ethylene.

Referring to Tables 1 and 2, the crystalline block composite samples CBC1, CBC2, and CBC3 are prepared by prepared using two continuous stirred tank reactors (CSTR) connected in series. The first reactor is approximately 12 gallons in volume while the second reactor is approximately 26 gallons. Each reactor is hydraulically full and set to operate at steady state conditions. Monomers, Solvent, Catalyst, Cocatalyst-1, Cocatalyst-2, and CSA-1 are flowed to Referring to Tables 1 and 2, the block composite sample BC1 is synthesized in dual reactors in series in a similar fashion to the Crystalline Block Composite samples. The first reactor in each case was approximately 12 gallons in volume while the second reactor was approximately 26 gallons. The process conditions are contained in Table 2B.

TABLE 2B

| | BC1 Reactor | |
|---|---|---|
| Material | 1st Reactor | 2nd Reactor |
| Reactor Control Temp. (° C.) | 105 | 115 |
| Solvent Feed (lb/hr) | 145 | 216 |
| Propylene Feed (lb/hr) | 10.3 | 46.3 |
| Ethylene Feed (lb/hr) | 20 | 0 |

TABLE 2B-continued

| | BC1 Reactor | |
|---|---|---|
| Material | 1st Reactor | 2nd Reactor |
| Hydrogen Feed SCCM) | 9.7 | 9.8 |
| Reactor Propylene Conc. (g/L) | 2.15 | 2.15 |
| Catalyst Efficiency (gPoly/gM) *1.0E6 | 1.87 | 0.05 |
| Catalyst Flow (lb/hr) | 1.07 | 2.33 |
| Catalyst Conc. (ppm) | 15 | 400 |
| Cocatalyst-1 Flow (lb/hr) | 0.81 | 2.12 |
| Cocatalyst-1 Conc. (ppm) | 200 | 4000 |
| Cocatalyst-2 Flow (lb/hr) | 0.35 | 0.30 |
| Cocatalyst-2 Conc. (ppm) | 3600 | 2686 |
| DEZ Flow (lb/hr) | 1.06 | 0 |
| DEZ Conc. (ppm) | 30000 | 0 |

Table 3 shows other properties of the crystalline block composites CBC1, CBC2, and CBC3 and of BC1. Table 3 provides details of the composition for each of the crystalline block composites.

TABLE 3

| Ex. | MFR (230° C./ 2.16 kg) | Wt % PP from HTLC Separation | Mw Kg/mol | Mw/Mn | Total Wt % $C_2$* | Tm (° C.) Peak 1 (Peak 2) | Melt Enthalpy (J/g) | Crystalline Block Composite Index | Block Composite Index |
|---|---|---|---|---|---|---|---|---|---|
| CBC1 | 6.8 | 21.3 | 117 | 3.14 | 46.7 | 128 (105) | 88 | 0.560 | Not applicable |
| CBC2 | 4.9 | 35.8 | 160 | 2.84 | 29.4 | 139 (104) | 81 | 0.473 | Not applicable |
| CBC3 | 1.4 | 7.2 | 133 | 4.61 | 68.5 | 122 (114) | 123 | 0.702 | Not applicable |
| BC1 | 4.8 | 23.0 | 164 | 4.39 | 26.2 | 141 | 72 | Not applicable | 0.521 |

Polymer Characterization Methods, a discussion of the methods used may also be found in, e.g., U.S. Patent Publication Nos. 2011/0313106, 2011/0313107, and 2011/0313108.

Melt flow rate (MFR) is measured in accordance with ASTM D-1238 (230° C.; 2.16 kg). The result is reported in grams/10 minutes.

High Temperature Liquid Chromatography (HTLC) is performed according to the methods disclosed in U.S. Pat. No. 8,076,147 and US Patent Application Publication No. 2011/152499, both of which are herein incorporated by reference. Samples are analyzed by the methodology described below.

A Waters GPCV2000 high temperature SEC chromatograph is reconfigured to build the HT-2DLC instrumentation. Two Shimadzu LC-20AD pumps are connected to the injector valve in GPCV2000 through a binary mixer. The first dimension (D1) HPLC column is connected between the injector and a 10-port switch valve (Valco Inc). The second dimension (D2) SEC column is connected between the 10-port valve and LS (Varian Inc.), IR (concentration and composition), RI (refractive index), and IV (intrinsic viscosity) detectors. RI and IV are built-in detector in GPCV2000. The IR5 detector is provided by PolymerChar, Valencia, Spain.

Columns: The D1 column is a high temperature Hypercarb graphite column (2.1×100 mm) purchased from Thermo Scientific. The D2 column is a PLRapid-H column purchased from Varian (10×100 mm).

Reagents: HPLC grade trichlorobenzene (TCB) is purchased from Fisher Scientific. 1-Decanol and decane are from Aldrich. 2,6-Di-tert-butyl-4-methylphenol (Ionol) is also purchased from Aldrich.

Sample Preparation: 0.01-0.15 g of polyolefin sample is placed in a 10-mL Waters autosampler vial. 7-mL of either 1-decanol or decane with 200 ppm Ionol is added to the vial afterwards. After sparging helium to the sample vial for about 1 min, the sample vial is put on a heated shaker with temperature set at 160° C. The dissolution is done by shaking the vial at the temperature for 2 hr. The vial is then transferred to the autosampler for injection.

HT-2DLC: The D1 flow rate is at 0.01 mL/min. The composition of the mobile phase is 100% of the weak eluent (1-decanol or decane) for the first 10 min of the run. The composition is then increased to 60% of strong eluent (TCB) in 489 min. The data is collected for 489 min as the duration of the raw chromatogram. The 10-port valve switches every three minutes yielding 489/3=163 SEC chromatograms. A post-run gradient is used after the 489 min data acquisition time to clean and equilibrate the column for the next run:

Clean Step:
1. 490 min: flow=0.01 min; //Maintain the constant flow rate of 0.01 mL/min from 0-490 min.
2. 491 min: flow=0.20 min; //Increase the flow rate to 0.20 mL/min.
3. 492 min: % B=100; //Increase the mobile phase composition to 100% TCB
4. 502 min: % B=100; //Wash the column using 2 mL of TCB Equilibrium Step:
5. 503 min: % B=0; //Change the mobile phase composition to 100% of 1-decanol or decane
6. 513 min: % B=0; //Equilibrate the column using 2 mL of weak eluent
7. 514 min: flow=0.2 mL/min; //Maintain the constant flow of 0.2 mL/min from 491-514 min
8. 515 min: flow=0.01 mL/min; //Lower the flow rate to 0.01 mL/min.

After step 8, the flow rate and mobile phase composition are the same as the initial conditions of the run gradient.

The D2 flow rate was at 2.51 mL/min. Two 60 µL loops are installed on the 10-port switch valve. 30-µL of the eluent from D1 column is loaded onto the SEC column with every switch of the valve.

The IR, LS15 (light scattering signal at 15°), LS90 (light scattering signal at) 90°, and IV (intrinsic viscosity) signals are collected by EZChrom through a SS420X analogue-to-digital conversion box. The chromatograms are exported in ASCII format and imported into a home-written MATLAB software for data reduction. Using an appropriate calibration curve of polymer composition and retention volume, of polymers that are of similar nature of the hard block and soft block contained in the block composite being analyzed. Calibration polymers should be narrow in composition (both molecular weight and chemical composition) and span a reasonable molecular weight range to cover the composition of interest during the analysis. Analysis of the raw data was calculated as follows, the first dimension HPLC chromatogram was reconstructed by plotting the IR signal of every cut (from total IR SEC chromatogram of the cut) as a function of the elution volume. The IR vs. D1 elution volume was normalized by total IR signal to obtain weight fraction vs. D1 elution volume plot. The IR methyl/measure ratio was obtained from the reconstructed IR measure and IR methyl chromatograms. The ratio was converted to composition using a calibration curve of PP wt. % (by NMR) vs. methyl/measure obtained from SEC experiments. The MW was obtained from the reconstructed IR measure and LS chromatograms. The ratio was converted to MW after calibration of both IR and LS detectors using a PE standard.

Molecular weight distribution (MWD) is measured using Gel Permeation Chromatography (GPC). In particular, conventional GPC measurements are used to determine the weight-average (Mw) and number-average (Mn) molecular weight of the polymer, and to determine the MWD (which is calculated as Mw/Mn). Samples are analyzed with a high-temperature GPC instrument (Polymer Laboratories, Inc. model PL220). The method employs the well-known universal calibration method, based on the concept of hydrodynamic volume, and the calibration is performed using narrow polystyrene (PS) standards, along with four Mixed A 20 μm columns (PLgel Mixed A from Agilent (formerly Polymer Laboratory Inc.)) operating at a system temperature of 140° C. Samples are prepared at a "2 mg/mL" concentration in 1,2,4-trichlorobenzene solvent. The flow rate is 1.0 mL/min, and the injection size is 100 microliters.

As discussed, the molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in Journal of Polymer Science, Polymer Letters, Vol. 6, (621) 1968) to derive the following equation:

$M\text{polyethylene}=a*(M\text{polystyrene})^b$.

In this equation, a=0.4316 and b=1.0 (as described in Williams and Ward, J. Polym. Sc., Polym. Let., 6, 621 (1968)). Polyethylene equivalent molecular weight calculations were performed using VISCOTEK TriSEC software Version 3.0.

$^{13}$C Nuclear Magnetic Resonance (NMR) is performed using samples that are prepared by adding approximately 2.7 g of a 50/50 mixture of tetrachloroethane-d2/orthodichlorobenzene that is 0.025M in chromium acetylacetonate (relaxation agent) to 0.21 g sample in a 10 mm NMR tube. The samples are dissolved and homogenized by heating the tube and its contents to 150° C. The data is collected using a Bruker 400 MHz spectrometer equipped with a Bruker Dual DUL high-temperature CryoProbe. The data is acquired using 320 transients per data file, a 7.3 sec pulse repetition delay (6 sec delay+1.3 sec acquisition time), 90 degree flip angles, and inverse gated decoupling with a sample temperature of 125° C. All measurements are made on non spinning samples in locked mode. Samples are homogenized immediately prior to insertion into the heated (130° C.) NMR Sample changer, and are allowed to thermally equilibrate in the probe for 15 minutes prior to data acquisition. Comonomer content in the crystalline block composite polymers is measurable using this technique.

Differential Scanning calorimetry (DSC) is used to measure crystallinity in the polymers. About 5 to 8 mg of polymer sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for polypropylene or "PP"). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)× 100 (for PE)). Unless otherwise stated, melting point(s) ($T_m$) of each polymer is determined from the second heat curve (peak Tm), and the crystallization temperature ($T_c$) is determined from the first cooling curve (peak Tc).

Crystalline Block Composite Index:

Calculation of Composition of Crystalline Block Composite is a summation of the weight % propylene from each component in the polymer according to equation 1 results in the overall weight % propylene and/or ethylene (of the whole polymer). This mass balance equation can be used to quantify the amount of the PP and PE present in the block copolymer. This mass balance equation can also be used to quantify the amount of PP and PE in a binary blend or extended to a ternary, or n-component blend. For the crystalline block composite, the overall amount of PP or PE is contained within the blocks present in the block and the unbound PP and PE polymers.

$$\text{Wt \% } C3_{Overall}=w_{PP}(\text{wt \% } C3_{PP})+w_{PE}(\text{wt \% } C3_{PE}) \quad \text{Eq. 1}$$

where $w_{PP}$=weight fraction of PP in the polymer
$w_{PE}$=weight fraction of PE in the polymer
wt % $C3_{PP}$=weight percent of propylene in PP component or block
wt % $C3_{PE}$=weight percent of propylene in PE component or block.

Note that the overall weight % of propylene ($C_3$) is preferably measured from $C^{13}$ NMR or some other composition measurement that represents the total amount of $C_3$ present in the whole polymer. The weight % propylene in the PP block (wt % $C_{3PP}$) is set to 100 or if otherwise known from its DSC melting point, NMR measurement, or other composition estimate, that value can be put into its place. Similarly, the weight % propylene in the PE block (wt % $C_{3PE}$) is set to 100 or if otherwise known from its DSC melting point, NMR measurement, or other composition estimate, that value can be put into its place.

Crystalline Block Composite Index (CBCI), referring to Table 3, is measured based on the method shown in Table 1A, below. In particular, CBCI provides an estimate of the quantity of block copolymer within the crystalline block composite under the assumption that the ratio of CEB to CAOB within a diblock copolymer is the same as the ratio of crystalline ethylene to crystalline alpha-olefin in the overall crystalline block composite. This assumption is valid for these statistical olefin block copolymers based on the understanding of the individual catalyst kinetics and the polymerization mechanism for the formation of the diblocks via chain shuttling catalysis as described in the specification. This CBCI analysis shows that the amount of isolated PP is less than if the polymer was a simple blend of a propylene homopolymer (in this example the CAOP) and polyethylene (in this example the CEP). Consequently, the polyethylene fraction contains an appreciable amount of propylene that would not otherwise be present if the polymer was simply a blend of polypropylene and polyethylene. To account for this "extra propylene", a mass balance calculation can be performed to estimate the CBCI from the amount of the polypropylene and polyethylene fractions and the weight percent propylene present in each of the fractions that are separated by high temperature liquid chromatography (HTLC).

TABLE 3A

| Line # | Variable | Source | CBC1 | CBC2 | CBC3 |
|---|---|---|---|---|---|
| 1 | Overall wt % C3 Total | Measured | 53.300 | 70.600 | 31.500 |
| 2 | wt % C3 in PP block/polymer | Measured | 99.000 | 99.000 | 99.000 |
| 3 | wt % C3 in PE block/polymer | Measured | 10.500 | 10.500 | 10.000 |
| 4 | wt fraction PP (in block or polymer) | Eq. 2 below | 0.484 | 0.679 | 0.242 |
| 5 | wt fraction PE (in block or polymer) | 1-Line 4 | 0.516 | 0.321 | 0.758 |
| | Analysis of HTLC Separation | | | | |
| 6 | wt fraction isolated PP | Measured | 0.213 | 0.358 | 0.072 |
| 7 | wt fraction PE fraction | Measured | 0.787 | 0.642 | 0.928 |
| 8 | wt % C3 in PE-fraction | Eq. 4 below | 40.931 | 54.763 | 26.263 |
| 9 | wt fraction PP-diblock in PE fraction | Eq. 6 below | 0.344 | 0.500 | 0.183 |
| 10 | wt fraction PE in PE fraction | 1-Line 10 | 0.656 | 0.500 | 0.817 |
| 11 | wt fraction Diblock in PE fraction | 10/Line 4 | 0.711 | 0.736 | 0.756 |
| 12 | Crystalline Block Composite Index (CBCI) | Eq. 7 below | 0.560 | 0.473 | 0.702 |

Referring to Table 3A, Crystalline Block Composite Index (CBCI) is measured by first determining a summation of the weight percent propylene from each component in the polymer according to Equation 1, below, which results in the overall weight percent, as discussed above with respect to the Methods for Calculation of Composition of Crystalline Block Composite. In particular, the mass balance equation is as follows:

$$\text{Wt \% } C3_{Overall} = w_{PP}(\text{wt \% } C3_{PP}) + w_{PE}(\text{wt \% } C3_{PE}) \quad \text{Eq. 1}$$

where
$w_{PP}$=weight fraction of PP in the polymer
$w_{PE}$=weight fraction of PE in the polymer
wt % $C3_{PP}$=weight percent of propylene in PP component or block
wt % $C3_{PE}$=weight percent of propylene in PE component or block For calculating the Ratio of PP to PE in the crystalline block composite:

Based on Equation 1, the overall weight fraction of PP present in the polymer can be calculated using Equation 2 from the mass balance of the total C3 measured in the polymer. Alternatively, it could also be estimated from a mass balance of the monomer and comonomer consumption during the polymerization. Overall, this represents the amount of PP and PE present in the polymer regardless of whether it is present in the unbound components or in the diblock copolymer. For a conventional blend, the weight fraction of PP and weight fraction of PE corresponds to the individual amount of PP and PE polymer present. For the crystalline block composite, it is assumed that the ratio of the weight fraction of PP to PE also corresponds to the average block ratio between PP and PE present in this statistical block copolymer.

$$w_{PP} = \frac{\text{wt \% } C3_{Overall} - \text{wt \% } C3_{PE}}{\text{wt \% } C3_{PP} - \text{wt \% } C3_{PE}} \quad \text{Eq. 2}$$

where
$w_{pp}$=weight fraction of PP present in the whole polymer
wt % $C3_{PP}$=weight percent of propylene in PP component or block
wt % $C3_{PE}$=weight percent of propylene in PE component or block To estimate the amount of the block in the Crystalline Block Composite, apply Equations 3 through 5, and the amount of the isolated PP that is measured by HTLC analysis is used to determine the amount of polypropylene present in the diblock copolymer. The amount isolated or separated first in the HTLC analysis represents the 'unbound PP' and its composition is representative of the PP hard block present in the diblock copolymer. By substituting the overall weight percent C3 of the whole polymer in the left hand side of Equation 3, and the weight fraction of PP (isolated from HTLC) and the weight fraction of PE (separated by HTLC) into the right hand side of equation 3, the weight percent of C3 in the PE fraction can be calculated using Equations 4 and 5. The PE fraction is described as the fraction separated from the unbound PP and contains the diblock and unbound PE. The composition of the isolated PP is assumed to be the same as the weight percent propylene in the iPP block as described previously.

$$\text{wt \% } C3_{Overall} = w_{PPisolated}(\text{wt \% } C3_{PP}) + w_{PE\text{-}fraction}(\text{wt \% } C3_{PE\text{-}fraction}) \quad \text{Eq. 3}$$

$$\text{wt \% } C3_{PE\text{-}fraction} = \frac{\text{wt \% } C3_{Overall} - w_{PPisolated}(\text{wt \% } C3_{PP})}{w_{PE\text{-}fraction}} \quad \text{Eq. 4}$$

$$w_{PE\text{-}fraction} = 1 - w_{PPisolated} \quad \text{Eq. 5}$$

where
$w_{PPisolated}$=weight fraction of isolated PP from HTLC
$w_{PE\text{-}fraction}$=weight fraction of PE separated from HTLC, containing the diblock and unbound PE
wt % $C3_{PP}$=weight percent of propylene in the PP; which is also the same amount of propylene present in the PP block and in the unbound PP
wt % $C3_{PE\text{-}fraction}$=weight percent of propylene in the PE-fraction that was separated by HTLC
wt % $C3_{Overall}$=overall weight percent propylene in the whole polymer The amount of wt % C3 in the polyethylene fraction from HTLC represents the amount of propylene present in the block copolymer fraction that is above the amount present in the 'unbound polyethylene'. To account for the 'additional' propylene present in the polyethylene fraction, the only way to have PP present in this fraction is for the PP polymer chain to be connected to a PE polymer chain (or else it would have been isolated with the PP fraction separated by HTLC). Thus, the PP block remains adsorbed with the PE block until the PE fraction is separated.

The amount of PP present in the diblock is calculated using Equation 6.

$$w_{PP\text{-}diblock} = \frac{\text{wt \% } C3_{PE\text{-}fraction} - \text{wt \% } C3_{PE}}{\text{wt \% } C3_{PP} - \text{wt \% } C3_{PE}} \quad \text{Eq. 6}$$

Where
wt % $C3_{PE\text{-}fraction}$=weight percent of propylene in the PE-fraction that was separated by HTLC (Equation 4)
wt % $C3_{PP}$=weight percent of propylene in the PP component or block (defined previously)
wt % $C3_{PE}$=weight percent of propylene in the PE component or block (defined previously)
$w_{PP\text{-}diblock}$=weight fraction of PP in the diblock separated with PE-fraction by HTLC The amount of the diblock present in this PE fraction can be estimated by assuming that the ratio of the PP block to PE block is the same as the overall ratio of PP to PE present in the whole polymer. For example, if the overall ratio of PP to PE is 1:1 in the whole polymer, then it assumed that the ratio of PP to PE in the diblock is also 1:1. Thus the weight fraction of diblock present in the PE fraction would be weight fraction of PP in the diblock ($w_{PP\text{-}diblock}$) multiplied by two. Another way to calculate this is by dividing the weight fraction of PP in the diblock ($w_{PP\text{-}diblock}$) by the weight fraction of PP in the whole polymer (Equation 2).

To further estimate the amount of diblock present in the whole polymer, the estimated amount of diblock in the PE fraction is multiplied by the weight fraction of the PE fraction measured from HTLC. To estimate the crystalline block composite index, the amount of diblock copolymer is determined by Equation 7. To estimate the CBCI, the weight fraction of diblock in the PE fraction calculated using Equation 6 is divided by the overall weight fraction of PP (as calculated in equation 2) and then multiplied by the weight fraction of the PE fraction. The value of the CBCI can range from 0 to 1, wherein 1 would be equal to 100% diblock and zero would be for a material such as a traditional blend or random copolymer.

$$CBCI = \frac{w_{PP\text{-}diblock}}{w_{PP}} \cdot w_{PE\text{-}fraction} \quad \text{EQ. 7}$$

where
$w_{PP\text{-}diblock}$=weight fraction of PP in the diblock separated with the PE-fraction by HTLC (Equation 6)
$w_{PP}$=weight fraction of PP in the polymer
$w_{PE\text{-}fraction}$=weight fraction of PE separated from HTLC, containing the diblock and unbound PE (Equation 5)

For example, if an iPP-PE (i.e., isotactic polypropylene block and propylene-ethylene block) polymer contains a total of 53.3 wt % C3 and is made under the conditions to produce an PE polymer with 10 wt % C3 and an iPP polymer containing 99 wt % C3, the weight fractions of PP and PE are 0.487 to 0.514, respectively (as calculated using Equation 2).

Block Composite Index:

For a block composite derived from ethylene and propylene, the insoluble fractions will contain an appreciable amount of ethylene that would not otherwise be present if the polymer was simply a blend of iPP homopolymer and EP copolymer. To account for this "extra ethylene", a mass balance calculation can be performed to estimate a block composite index from the amount of xylene insoluble and soluble fractions and the weight % ethylene present in each of the fractions, which is shown in Table 2.

A summation of the weight % ethylene from each fraction according to equation 1 results in an overall weight % ethylene (in the polymer). This mass balance equation can also be used to quantify the amount of each component in a binary blend or extended to a ternary, or n-component blend.

$$\text{Wt \% } C2_{Overall} = w_{Insoluble}(\text{wt \% } C2_{Insoluble}) + w_{soluble}(\text{wt \% } C2_{soluble}) \quad \text{Eq. 1}$$

Applying equations 2 through 4, the amount of the soft block (providing the source of the extra ethylene) present in the insoluble fraction is calculated. By substituting the weight % $C_2$ of the insoluble fraction in the left hand side of equation 2, the weight % iPP hard and weight % EP soft can be calculated using equations 3 and 4. Note that the weight % of ethylene in the EP soft is set to be equal to the weight % ethylene in the xylene soluble fraction. The weight % ethylene in the iPP block is set to zero or if otherwise known from its DSC melting point or other composition measurement, the value can be put into its place.

$$\text{Wt \% } C2_{Overall\ or\ xylene\ insoluble} = \quad \text{Eq. 2}$$
$$w_{iPPHard}(\text{wt \% } C2_{iPP}) + w_{EPsoft}(\text{wt \% } C2_{EPsoft})$$

$$w_{iPPhard} = \frac{\text{wt \% } C2_{overall\ or\ xyleneinsoluble} - \text{wt \% } C2_{EPsoft}}{\text{wt \% } C2_{iPPhard} - \text{wt \% } C2_{EPsoft}} \quad \text{Eq. 3}$$

$$w_{EPsoft} = 1 - w_{iPPHard} \quad \text{Eq. 4}$$

After accounting for the 'additional' ethylene present in the insoluble fraction, the only way to have an EP copolymer present in the insoluble fraction, the EP polymer chain must be connected to an iPP polymer block (or else it would have been extracted into the xylene soluble fraction). Thus, when the iPP block crystallizes, it prevents the EP block from solubilizing.

To estimate the block composite index, the relative amount of each block must be taken into account. To approximate this, the ratio between the EP soft and iPP hard is used. The ratio of the EP soft polymer and iPP hard polymer can be calculated using Equation 2 from the mass balance of the total ethylene measured in the polymer. Alternatively it could also be estimated from a mass balance of the monomer and comonomer consumption during the polymerization. The weight fraction of iPP hard and weight fraction of EP soft is calculated using Equation 2 and assumes the iPP hard contains no ethylene. The weight % ethylene of the EP soft is the amount of ethylene present in the xylene soluble fraction.

For example, if an iPP-EP block composite contains an overall ethylene content of 47 wt % $C_2$ and is made under conditions to produce an EP soft polymer with 67 wt % $C_2$ and an iPP homopolymer containing zero ethylene, the amount of EP soft and iPP hard is 70 wt % and 30 wt %, respectively (as calculated using Equations 3 and 4). If the percent of EP is 70 wt % and the iPP is 30 wt %, the relative ratio of the EP:iPP blocks could be expressed as 2.33:1.

Hence, if one skilled in the art carries out a xylene extraction of the polymer and recovers 40 wt % insoluble and 60 wt % soluble, this would be an unexpected result and this would lead to the conclusion that a fraction of block copolymer was present. For example, if the ethylene content of the insoluble fraction is subsequently measured to be 25 wt % $C_2$, Equations 2 thru 4 can be solved to account for this additional ethylene and result in 37.3 wt % EP soft polymer and 62.7 wt % iPP hard polymer present in the insoluble fraction. Since the insoluble fraction contains 37.3 wt % EP copolymer, it should be attached to an additional 16 wt % of iPP polymer based on the EP:iPP block ratio of 2.33:1. This brings the estimated amount of diblock in the insoluble fraction to be 53.3 wt %. For the entire polymer (unfractionated), the composition is described as 21.3 wt % iPP-EP Diblock, 18.7 wt % iPP polymer, and 60 wt % EP polymer.

The term block composite index (BCI) is herein defined to equal the weight percentage of diblock divided by 100% (i.e. weight fraction). The value of the block composite index can range from 0 to 1, wherein 1 would be equal to 100% diblock and zero would be for a material such as a traditional blend or random copolymer. For the example described above, the block composite index for the block composite is 0.213. For the insoluble fraction, the BCI is 0.533, and for the soluble fraction the BCI is assigned a value of zero.

Depending on the estimations made of the total polymer composition and the error in the analytical measurements which are used to estimate the composition of the hard and soft blocks, between 5 to 10% relative error is possible in the computed value of the block composite index. Such estimations include the wt % C2 in the iPP hard block as measured from the DSC melting point, NMR analysis, or process conditions; the average wt % C2 in the soft block as estimated from the composition of the xylene solubles, or by NMR, or by DSC melting point of the soft block (if detected). But overall, the block composite index calculation reasonably accounts for the unexpected amount of 'additional' ethylene present in the insoluble fraction, the only way to have an EP copolymer present in the insoluble fraction, the EP polymer chain must be connected to an iPP polymer block (or else it would have been extracted into the xylene soluble fraction).

Preparation of Films

Table 4 details the resulting multilayer films and some of the processing parameters.

TABLE 4

| Structure | Three layer multilayer film with a PP base layer/tie layer/sealant layer |
|---|---|
| Layer thickness ratio | Three films with layer thickness ratios of 20/6/4, 20/4/6, 20/2/8 |
| Orientation | 4 machine direction (MD) × 8 transverse direction (TD)* |
| Film thickness after biaxial stretch | 20~30 μm |
| Film fabrication | Cast co-extruded followed by biaxial stretch |

*Stretched to an extension ratio of 4 in the machine direction and an extension ratio of 8 in the transverse direction.

The methods of testing and the standards used for these tests are detailed below.

Density is determined according to ASTM D-792. Melt flow rate for propylene polymers (that is, those polymers comprising greater than 50% by weight of units derived from propylene monomer) is determined according to ASTM D1238, 230° C., 2.16 kg).

Melt index, or I2, for ethylene polymers (that is, those polymers comprising at least 50% by weight of units derived from ethylene monomer) is determined according to ASTM D1238, 190° C., 2.16 kg.

Heat seal strength is determined in accordance with the following method as used on a J&B hot-tack tester model 4000 and ZWICK Z010 Universal Tensile Tester with the following settings:

Sample width: 25 mm
Seal pressure: 0.275 N/mm2
Seal time: 0.5 s
Condition time (after heat seal): 24 hours
Peel speed: 500 mm/min Heat seal initiation temperature is determined as the minimum temperature at which a seal of 4.4 N/25 mm or 1.0 lb/inch is obtained. Secant Modulus is determined using ASTM D822 with speed 25 mm/min and sample width 25 mm. Water vapor transmission rate (WVTR) is determined using ASTM F1249-90. Haze is determined using ASTM D1003.

Tables 5-8 shows the film compositions for a variety of different samples. Table 5 shows film compositions for the comparative and inventive examples with neat CBC polymer as tie layer. Table 6 shows film compositions for the inventive examples with neat CBC polymer as tie layer under different layer ratios. Table 7 shows film compositions for the inventive examples with different polymer blends as the tie layer comprising CBC polymer.

TABLE 5

| Example | Base Layer | Tie Layer | Sealant Layer |
|---|---|---|---|
| Layer thickness (μm) | 20 | 6 | 4 |
| Comparative A | h-PP | ELITE ™ 5230 | ELITE ™ 5230 |
| Comparative B | h-PP | VERSIFY ™ 3000 | VERSIFY ™ 3000 |
| Inventive 1 | h-PP | CBC1 | ELITE ™ 5230 |
| Inventive 2 | h-PP | CBC2 | ELITE ™ 5230 |
| Inventive 3 | h-PP | CBC3 | ELITE ™ 5230 |
| Inventive 4 | h-PP | BC1 | ELITE ™ 5230 |

TABLE 6

| Example | Base Layer | Tie Layer | Sealant Layer |
|---|---|---|---|
| Inventive 1 | h-PP | CBC1 | ELITE ™ 5230 |
| Layer thickness (μm) | 20 | 6 | 4 |
| Inventive 5 | h-PP | CBC1 | ELITE ™ 5230 |
| Layer thickness (μm) | 20 | 4 | 6 |
| Inventive 6 | h-PP | CBC1 | ELITE ™ 5230 |
| Layer thickness (μm) | 20 | 2 | 8 |

TABLE 7

| Example | Base Layer | Tie Layer | Sealant Layer |
|---|---|---|---|
| Layer thickness (μm) | 20 | 6 | 4 |
| Inventive 7 | h-PP | 25 wt % ELITE ™ 5230 + | ELITE ™ 5230 |

TABLE 7-continued

| Example | Base Layer | Tie Layer | Sealant Layer |
|---|---|---|---|
| Inventive 8 | h-PP | 75 wt % CBC1 + 25 wt % Ter-PP + 75 wt % CBC1 | ELITE ™ 5230 |
| Inventive 9 | h-PP | 30 wt % h-PP + 50 wt % ELITE ™ 5230 + 20 wt % CBC1 | ELITE ™ 5230 |
| Inventive 10 | h-PP | 25 wt % Ter-PP + 25 wt % ELITE ™ 5230 + 50 wt % CBC1 | ELITE ™ 5230 |
| Inventive 11 | h-PP | 80 wt % CBC1 + 20 wt % AFFINITY ™ EG 8100G | ELITE ™ 5230 |
| Inventive 12 | h-PP | 60 wt % CBC1 + 20 wt % AFFINITY ™ EG 8100G + 20 wt % ELITE ™ 5230 | ELITE ™ 5230 |

Tables 8-10 show the properties for the films shown in Tables 5-7 respectively.

The seal strength test data in Table 8 demonstrates that with same film layer ratio, the use of the CBC1 as tie layers of the films (Inventive 1 and 3) affords a higher ultimate seal strength as well as broader sealing window (seal strength>10N/25 mm) even when the same sealant resins is used in each film structure (Comp A). This data suggests that the tie layer composition significantly increases the interlayer adhesion to the outer and the sealant layers, and therefore increases the seal strength. The seal initiation temperature for Inventive 1 and 3 are below 110° C. The data also shows that the composition of CBC materials has an important influence on the seal strength of the film. The modulus data in Table 8 shows that using a CBC resin as the tie layer provides the film comparative haze, modulus and WVTR as the comparative examples.

The data in Table 9 demonstrates the effect of layer thickness on the seal strength. The Inventive 1, having a layer thickness of 20/6/4 μm, and Inventive 5, having a layer thickness of 20/4/6 μm, show the best seal strength. In contrast, Inventive 6, having a layer thickness of 20/2/8 μm, shows less desired seal strength.

The data in Table 10 demonstrates that the films with different polymers blends comprising CBC resins in the tie layer, also showed higher seal strength, a broader sealing

TABLE 8

| | Seal Strength - Max Force (N/25 mm) | | | | | Secant Modulus (MPa) | | | | Haze | WVTR |
|---|---|---|---|---|---|---|---|---|---|---|---|
| | | | | | | MD @1% | MD @2% | TD @1% | TD @2% | | |
| Example | 100° C. | 110° C. | 120° C. | 130° C. | 140° C. | | | | | (%) | (g/m²/day) |
| Comparative A | 4.3 | 4.4 | 6.6 | 11.1 | 6.4 | 1362.0 | 1050.0 | 1641.0 | 1612.0 | 1.9 | 11.4 |
| Comparative B | 2.7 | 5.5 | 9.5 | 6.5 | 6.3 | 1769.3 | 1205.3 | 2643.8 | 1916.1 | 5.4 | 11.4 |
| Inventive 1 | 1.1 | 23.5 | 34.6 | 33.1 | 26.2 | 1711.1 | 1141.3 | 2471.4 | 1708.5 | 5.2 | 13.0 |
| Inventive 2 | 1.5 | 9.1 | 8.1 | 13.3 | 14.8 | 1532.6 | 1125.0 | 2149.1 | 1508.3 | 5.4 | 10.6 |
| Inventive 3 | 2.3 | 20.9 | 18.1 | 17.7 | 12.3 | 1396.8 | 949.5 | 2999.1 | 2178.3 | 4.7 | 11.9 |
| Inventive 4 | 1.5 | 12.7 | 14.2 | 11.7 | 16.6 | 1540.3 | 1044.8 | 2727.9 | 1957.3 | 3.9 | 11.5 |

TABLE 9

| | Seal Strength - Max Force (N/25 mm) | | | | | Secant Modulus (MPa) | | | | Haze | WVTR |
|---|---|---|---|---|---|---|---|---|---|---|---|
| | | | | | | MD @1% | MD @2% | TD @1% | TD @2% | | |
| Example | 100° C. | 110° C. | 120° C. | 130° C. | 140° C. | | | | | (%) | (g/m²/day) |
| Inventive 1 | 1.1 | 23.5 | 34.6 | 33.1 | 26.2 | 1711.1 | 1141.3 | 2471.4 | 1708.5 | 5.2 | 13.0 |
| Inventive 5 | 1.6 | 20.4 | 31.9 | 21.0 | 21.2 | 1609.9 | 1070.3 | 2435.4 | 1712.2 | 6.3 | 11.2 |
| Inventive 6 | 6.4 | 13.4 | 7.3 | 17.5 | 11.2 | 1531.4 | 1061.0 | 2755.0 | 1968.0 | 4.7 | 11.2 |

TABLE 10

| | Seal Strength - Max Force (N/25 mm) | | | | | Secant Modulus (MPa) | | | | Haze | WVTR |
|---|---|---|---|---|---|---|---|---|---|---|---|
| | | | | | | MD @1% | MD @2% | TD @1% | TD @2% | | |
| Example | 100° C. | 110° C. | 120° C. | 130° C. | 140° C. | | | | | (%) | (g/m²/day) |
| Inventive 7 | 0.5 | 13.4 | 22.8 | 18.6 | 13.5 | 1597 | 1037 | 2273 | 1565 | 4.8 | 13.3 |
| Inventive 8 | 0.6 | 10.7 | 10.1 | 11.7 | 13.2 | 1870 | 1279 | 2741 | 1994 | 2.3 | 12.1 |
| Inventive 9 | 0.4 | 9.9 | 11.8 | 12.3 | 12.6 | 1773.2 | 1212.2 | 2755.3 | 2010.3 | 3.1 | 11.3 |
| Inventive 10 | 0.5 | 13.2 | 18.1 | 17.5 | 19.7 | 1630.1 | 1085.9 | 2456.1 | 1783.4 | 5.8 | 12.8 |
| Inventive 11 | 1.0 | 19.7 | 27.8 | 21.9 | 18.5 | 1493.3 | 1009.2 | 2381.0 | 1697.8 | 4.4 | 12.2 |
| Inventive 12 | 1.5 | 19.9 | 19.7 | 16.0 | 19.7 | 1282.5 | 874.3 | 2857.9 | 2081.3 | 4.9 | 14.0 |

What is claimed is:

1. A multilayer film comprising:
   a first layer comprising polyethylene and a second layer comprising polypropylene; where the second layer has a thickness of 10 to 70 μm; and
   a tie layer; where the tie layer comprises a crystalline block composite or a block composite;
   wherein the crystalline block composite comprises:
   a crystalline ethylene based polymer (CEP), a crystalline α-olefin based polymer (CAOP), and a block copolymer comprising a crystalline ethylene block (CEB) and a crystalline α-olefin block (CAOB), wherein the crystalline ethylene block of the block copolymer is the same composition as the crystalline ethylene based polymer in the block composite and the crystalline α-olefin block of the block copolymer is the same composition as the crystalline α-olefin based polymer of the block composite, and wherein a compositional split between the amount of crystalline ethylene based polymer and crystalline α-olefin based polymer is the same as that between the corresponding blocks in the block copolymer; and
   wherein the block composite comprises:
   (i) a soft ethylene copolymer (EP) having polymerized units in which the comonomer content is greater than 10 mol % and having less than 90 mol % polymerized ethylene,
   (ii) a hard or crystalline α-olefin polymer (CAOP), in which the α-olefin monomer is present in an amount of from greater than 90 up to 100 mol %, and
   (iii) a diblock block copolymer, having a soft segment and a hard segment, wherein the hard segment of the block copolymer is the same composition as the hard α-olefin polymer in the block composite and the soft segment of the block copolymer is essentially the same composition as the soft ethylene copolymer of the block composite,
   and where the tie layer is disposed between the first layer and the second layer; the first layer being disposed on a first surface of the tie layer; the second layer being disposed on a second surface of the tie layer; where the second surface is opposedly disposed to the first surface; where the multilayered film is biaxially oriented.

2. The multilayer film of claim 1 wherein the crystalline block composite in the tie layer comprises a crystalline α-olefin block in an amount of 30 to 70 weight % of the crystalline α-olefin block.

3. The multilayer film of claim 1 wherein the crystalline block composite has a crystalline block composite index of 0.3 to up to 1.0.

4. The multilayer film of claim 1 wherein the ethylene polymer of the block composite in the tie layer comprises at least 80 mol % polymerized ethylene.

5. The multilayer film of claim 1 wherein the crystalline block composite or the block composite has a melt flow rate of from 3 to 30 g/10 min when measured as per ASTM D 1238 at 230° C. and 2.16 kilograms.

6. The multilayer film of claim 1, where the tie layer further comprises an elastomer; and where the elastomer is a homogeneously branched ethylene-α-olefin copolymer, a polyolefin elastomer, a vinyl aromatic block copolymer, or a combination comprising at least one of the foregoing elastomers.

7. The multilayer film of claim 1, where the tie layer further comprises polyethylene.

8. The multilayer film of claim 7, where the polyethylene is selected from the group consisting of ultralow density polyethylene, low density polyethylene, linear low density polyethylene, medium density polyethylene, high density polyethylene, high melt strength high density polyethylene, ultrahigh density polyethylene, or combinations thereof.

9. The multilayer film of claim 1, where the polyethylene comprises linear low density polyethylene having a density of less than 0.930 grams per cubic centimeter.

10. The multilayer film of claim 1, where the first layer comprises a propylene-α-olefin interpolymer with a melting point of 90 to 140° C.

11. The multilayer film of claim 8, where the polypropylene is selected from the groups consisting of random copolymer polypropylene, impact copolymer polypropylene, high impact polypropylene, high melt strength polypropylene, isotactic polypropylene, syndiotactic polypropylene, or a combination comprising at least one of the foregoing polypropylenes.

12. The multilayer film of claim 1, where the polypropylene in the second layer is a polypropylene homopolymer.

13. The multilayer film of claim 1, where the film has a total thickness from 10 to 120 μm.

14. The multilayer film of claim 1, where the biaxial orientation comprises subjecting the multilayered film to a greater extension in the transverse direction than in the machine direction.

15. The multilayer film of claim 14, where the extension in the transverse direction is at least 50% greater than the extension in the machine direction.

16. An article comprising the multilayer film of claim 1.

17. A method of manufacturing a multilayer film comprising:
   coextruding a multilayer film comprising:
      a first layer comprising polyethylene and a second layer comprising polypropylene; where the second layer has a thickness of 10 to 70 μm; and
      a tie layer; where the tie layer comprises a crystalline block composite or a block composite;
   wherein the crystalline block composite comprises:
   a crystalline ethylene based polymer, a crystalline α-olefin based polymer, and a block copolymer comprising a crystalline ethylene block and a crystalline α-olefin block, wherein the crystalline ethylene block of the block copolymer is the same composition as the crystalline ethylene based polymer in the block composite and the crystalline α-olefin block of the block copolymer is the same composition as the crystalline α-olefin based polymer of the block composite, and wherein a compositional split between the amount of crystalline ethylene based polymer and crystalline α-olefin based polymer is the same as that between the corresponding blocks in the block copolymer; and
   wherein the block composite comprises:
   (i) a soft ethylene copolymer having polymerized units in which the comonomer content is greater than 10 mol % and having less than 90 mol % polymerized ethylene,
   (ii) a hard or crystalline α-olefin polymer, in which the α-olefin monomer is present in an amount of from greater than 90 up to 100 mol %, and
   (iii) a diblock block copolymer, having a soft segment and a hard segment, wherein the hard segment of the block copolymer is the same composition as the hard α-olefin polymer in the block composite and the soft segment of the block copolymer is essentially the same composition as the soft ethylene copolymer of the block composite, and where the tie layer is disposed between the first layer and the second layer; the first layer being disposed on a first surface of the tie layer; the second layer being disposed on a second surface of the tie layer; where the second surface is opposedly disposed to the first surface;

blowing or casting the multilayered film; and biaxially orienting the film.

18. The method of claim 17, further comprising laminating the film in a roll mill.

19. The method of claim 17, further comprising laminating the film in a compression mold.

* * * * *